(12) United States Patent
Nishida

(10) Patent No.: US 10,976,547 B2
(45) Date of Patent: Apr. 13, 2021

(54) SADDLE-TYPE VEHICLE

(71) Applicant: HONDA MOTOR CO., LTD., Tokyo (JP)

(72) Inventor: Yoichi Nishida, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 104 days.

(21) Appl. No.: 16/369,394

(22) Filed: Mar. 29, 2019

(65) Prior Publication Data
US 2019/0302452 A1 Oct. 3, 2019

(30) Foreign Application Priority Data

Mar. 30, 2018 (JP) .............................. JP2018-069146

(51) Int. Cl.
G02B 27/14 (2006.01)
G03H 1/00 (2006.01)
(Continued)

(52) U.S. Cl.
CPC .......... *G02B 27/0101* (2013.01); *B60K 35/00* (2013.01); *B60K 37/00* (2013.01); *B62J 17/04* (2013.01); *B62K 23/02* (2013.01); *G02B 27/01* (2013.01); *G02B 27/0103* (2013.01); *B60K 2370/1529* (2019.05); *B60Y 2200/12* (2013.01);
(Continued)

(58) Field of Classification Search
CPC ............ G02B 27/0172; G02B 27/0149; G02B 27/145; G02B 27/0101; G02B 27/144; G02B 27/126; G02B 27/1013; G02B 3/0056; G02B 27/0103; G02B 27/01; G09G 3/003; G09G 3/004; B60K 35/00; G08B 5/002; B60T 8/172; G06F 3/016; G08G 1/0969
USPC ....... 359/630–632, 618, 629, 640, 633, 638, 359/634, 639, 626, 13, 14; 348/115; 345/7, 9, 156; 349/11; 701/1; 340/980, 340/438, 995.1, 815.47, 815.74
See application file for complete search history.

(56) References Cited

U.S. PATENT DOCUMENTS

2002/0126391 A1 9/2002 Kushida et al.
2013/0190978 A1* 7/2013 Kato .................. G01C 21/3664
701/36
(Continued)

FOREIGN PATENT DOCUMENTS

EP 1143286 10/2001
JP 62-101534 5/1987
(Continued)

OTHER PUBLICATIONS

Japanese Office Action for Japanese Patent Application No. 2018-069146 dated Oct. 23, 2019.
(Continued)

*Primary Examiner* — Dawayne Pinkney
(74) *Attorney, Agent, or Firm* — Amin, Turocy & Watson, LLP

(57) ABSTRACT

A motorcycle comprising a transparent member that transparently passes light. The motorcycle further comprises a transparent electrode that is arranged on a windshield serving as the transparent member and can be manipulated by a rider (driver) of the motorcycle, a projection apparatus that projects video of a switch relating to manipulation of the motorcycle onto the transparent electrode.

10 Claims, 23 Drawing Sheets

(51) Int. Cl.
| | |
|---|---|
| *H04N 7/00* | (2011.01) |
| *G09G 5/00* | (2006.01) |
| *G02F 1/1335* | (2006.01) |
| *G05D 1/00* | (2006.01) |
| *G02B 27/01* | (2006.01) |
| *B62J 17/04* | (2006.01) |
| *B60K 37/00* | (2006.01) |
| *B60K 35/00* | (2006.01) |
| *B62K 23/02* | (2006.01) |
| *B62J 99/00* | (2020.01) |
| *B62J 45/00* | (2020.01) |
| *B62J 50/20* | (2020.01) |
| *B62J 50/25* | (2020.01) |

(52) U.S. Cl.
CPC ............... *B62J 45/00* (2020.02); *B62J 50/20* (2020.02); *B62J 50/25* (2020.02); *B62J 99/00* (2013.01); *G02B 2027/0141* (2013.01); *G02B 2027/0187* (2013.01); *G02B 2027/0196* (2013.01)

(56) References Cited

U.S. PATENT DOCUMENTS

| | | |
|---|---|---|
| 2014/0331129 A1 | 11/2014 | Saeki et al. |
| 2015/0002543 A1 | 1/2015 | Ting |
| 2015/0281430 A1* | 10/2015 | Cho .................. H04M 1/72577 455/418 |
| 2015/0309309 A1 | 10/2015 | Laluque et al. |
| 2016/0085332 A1 | 3/2016 | Herrera-Morales et al. |
| 2018/0088323 A1* | 3/2018 | Bao .................... G02B 27/0093 |

FOREIGN PATENT DOCUMENTS

| | | |
|---|---|---|
| JP | 62-253576 | 11/1987 |
| JP | 03-116193 | 5/1991 |
| JP | 04-325322 | 11/1992 |
| JP | 2000-071809 | 3/2000 |
| JP | 2001-278153 | 10/2001 |
| JP | 2007-080808 | 3/2007 |
| JP | 2011-116304 | 6/2011 |
| JP | 2015-132583 | 7/2015 |
| JP | 2016-053622 | 4/2016 |
| JP | 2016-161585 | 9/2016 |
| JP | 2017-056830 | 3/2017 |
| JP | 2017-144876 | 8/2017 |
| WO | 2013/088560 | 6/2013 |

OTHER PUBLICATIONS

Japanese Office Action for Japanese Patent Application No. 2018-069146 dated Jan. 21, 2020.
Extended European Search Report for European Patent Application No. 19165828.5 dated Aug. 19, 2019.

* cited by examiner

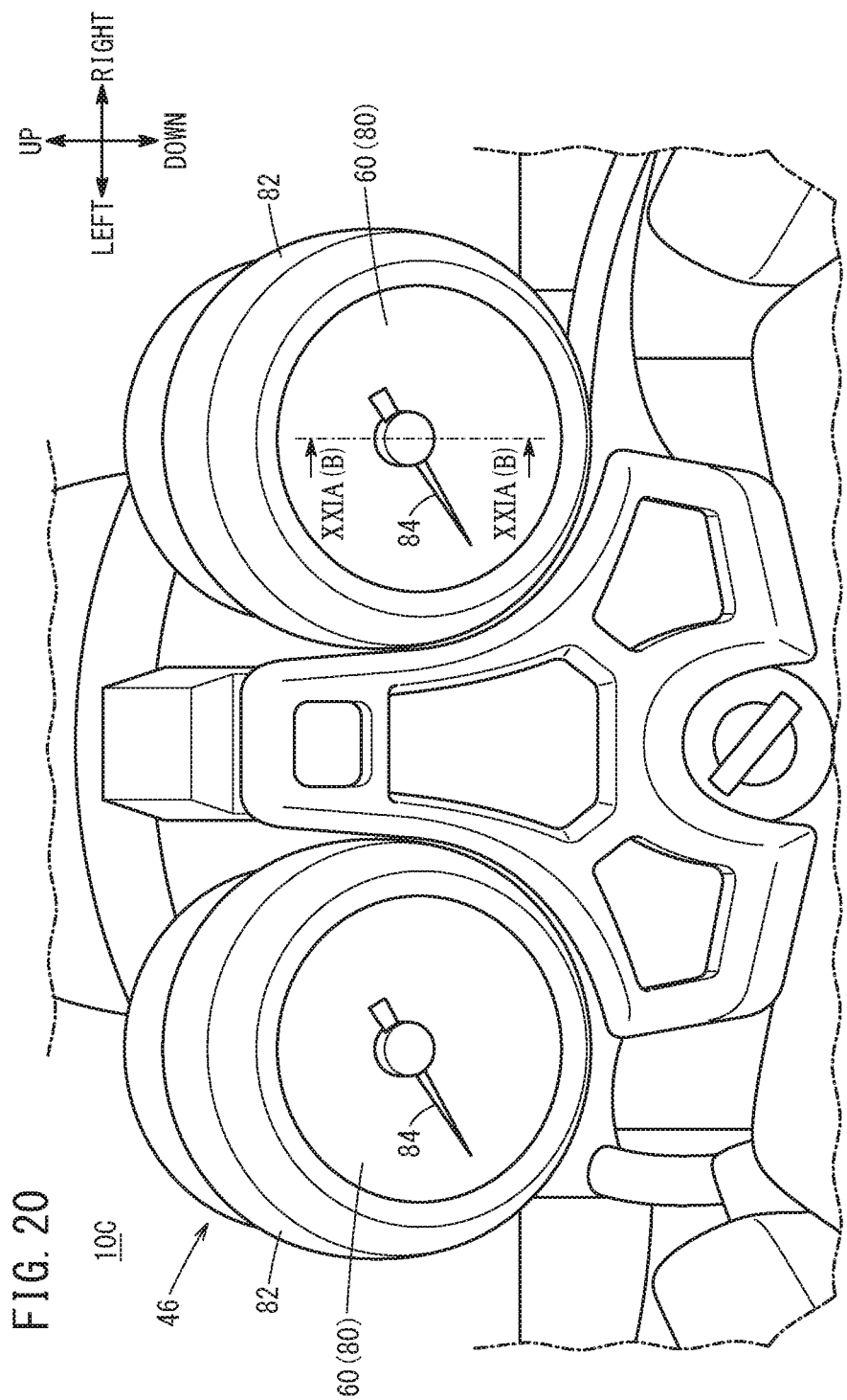

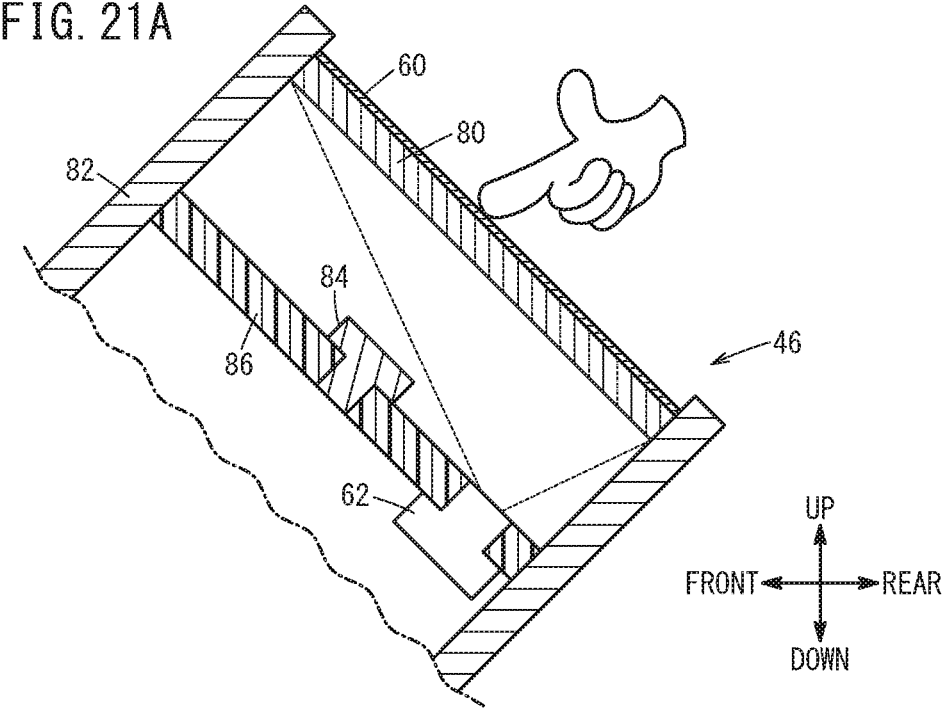
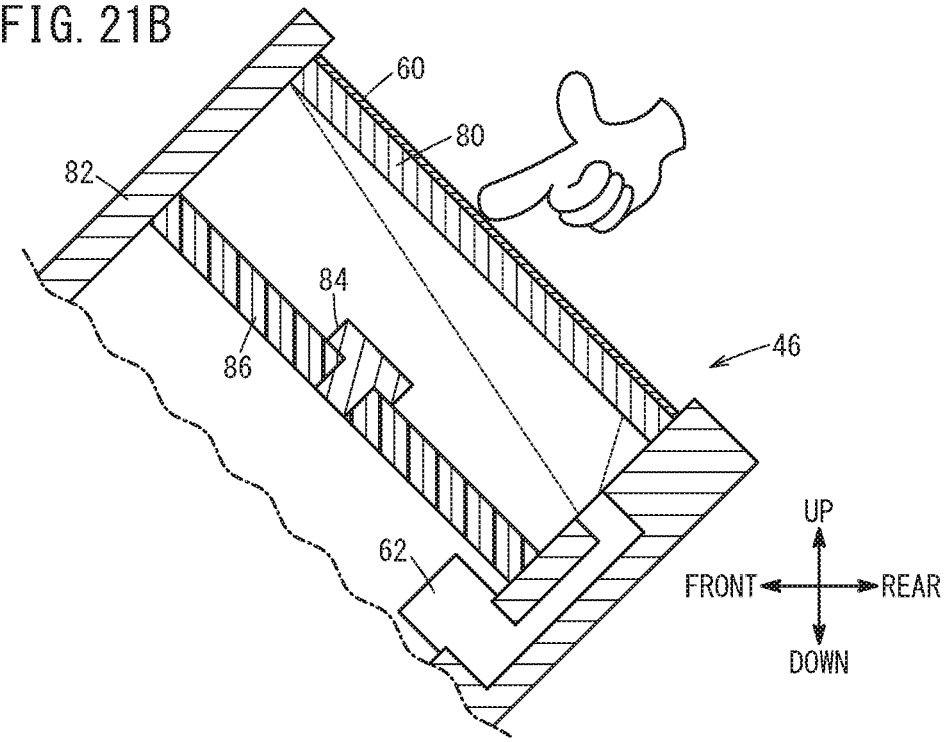

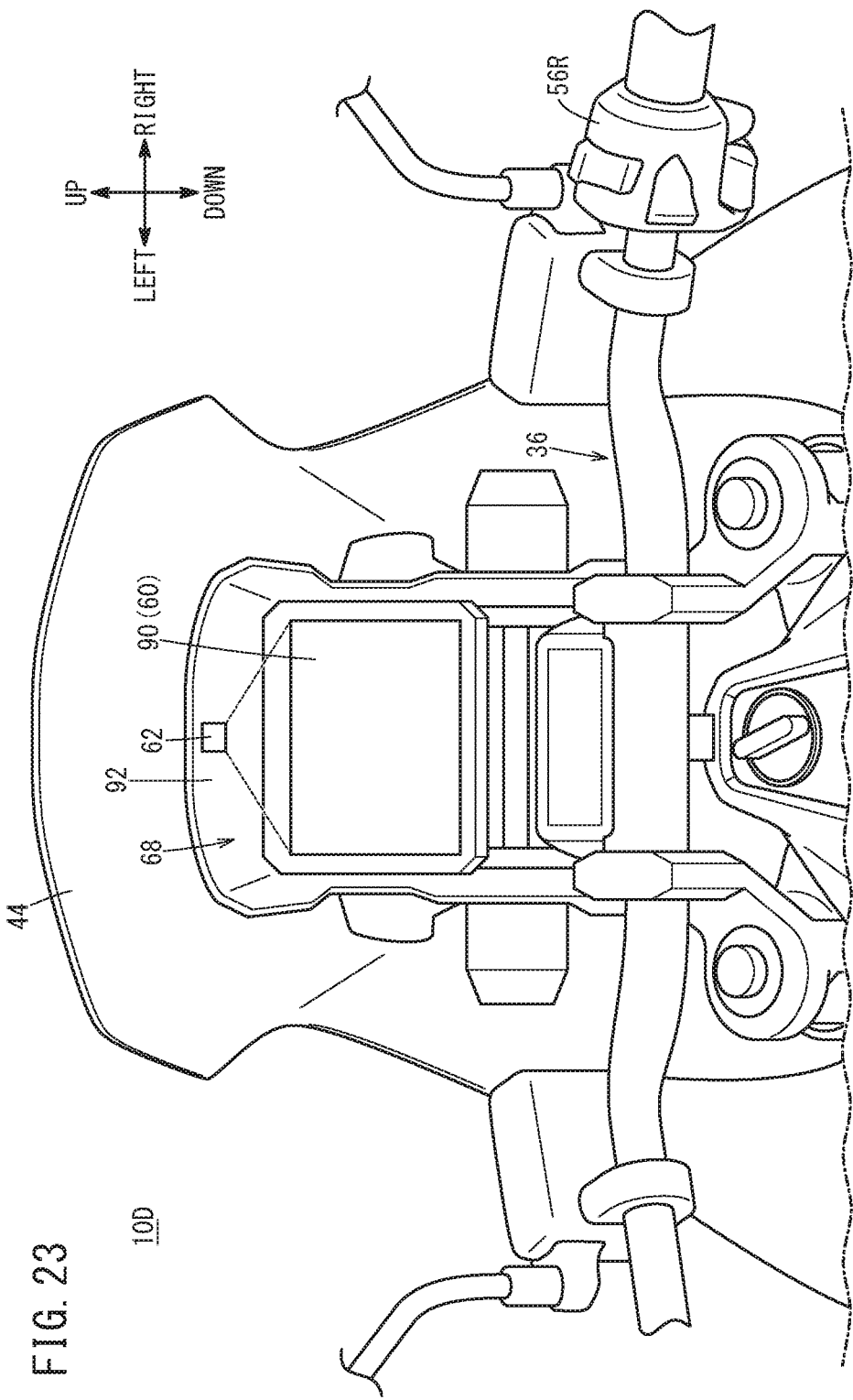

SADDLE-TYPE VEHICLE

CROSS-REFERENCE TO RELATED APPLICATION

This application is based upon and claims the benefit of priority from Japanese Patent Application No. 2018-069146 filed on Mar. 30, 2018, the contents of which are incorporated herein by reference.

BACKGROUND OF THE INVENTION

Field of the Invention

The present invention relates to a saddle-type vehicle including a transparent member that transparently passes light.

Description of the Related Art

Japanese Laid-Open Patent Publication No. 2000-071809 discloses arranging, on a steering handle of an automobile, a touch panel provided with a plurality of switches, and also arranging, on a front windshield or meter panel, a heads-up display that performs display according to the plurality of switches. In this case, when the driver (rider) manipulates the touch panel, a cursor is displayed at a corresponding position of the heads-up display in response to the manipulated position and the manipulation state.

SUMMARY OF THE INVENTION

However, in the technology of Japanese Laid-Open Patent Publication No. 2000-071809, the switch of the touch panel actually manipulated by the driver is at a different position than the switch displayed in the heads-up display, and therefore the driver cannot feel like they are directly manipulating the switch. Furthermore, it is necessary to preserve a space for arranging the touch panel and a space for arranging the heads-up display. Accordingly, in a saddle-type vehicle such as a motorcycle that is smaller than an automobile, it is difficult to preserve the space for arranging the touch panel and the heads-up display.

Therefore, it is an object of the present invention to provide a saddle-type vehicle in which it is possible to arrange a switch that a rider such as a driver can feel like they manipulate directly.

The present invention is a saddle-type vehicle comprising a transparent member that transparently passes light, and has the following features.

First Feature: The saddle-type vehicle further comprises a transparent electrode that is arranged on the transparent member and can be manipulated by a rider of the saddle-type vehicle; and a projection apparatus that projects video of a switch relating to manipulation of the saddle-type vehicle onto the transparent electrode.

Second Feature: The transparent member, the transparent electrode, and the projection apparatus are provided to the saddle-type vehicle and arranged in front of a seat on which the rider sits.

Third Feature: The transparent member is a windshield, a transparent lens of a meter apparatus, or a panel of a navigation apparatus, and the transparent electrode is arranged on a rider-side surface of the windshield, the transparent lens, or the panel.

Fourth Feature: In a case where the transparent electrode is arranged on the rider-side surface of the windshield, the projection apparatus is provided to an outer edge portion of the meter apparatus or the saddle-type vehicle, and is arranged on a steering handle, a top bridge, or a fuel tank arranged in front of the seat.

Fifth Feature: In a case where the transparent electrode is arranged on the rider-side surface of the transparent lens, the projection apparatus is provided inside the meter apparatus and projects the video of the switch onto the transparent electrode via the transparent lens.

Sixth Feature: In a case where the transparent electrode is arranged on the rider-side surface of the panel, the projection apparatus is provided on an outer edge portion of the navigation apparatus.

Seventh Feature: The projection apparatus at least projects the video of the switch onto the transparent electrode while the saddle-type vehicle is stopped.

Eighth Feature: The projection apparatus projects the video of the switch with a small size onto a corner portion of the transparent electrode while the saddle-type vehicle is travelling, and projects the video of the switch with a large size onto a center portion of the transparent electrode while the saddle-type vehicle is stopped.

Ninth Feature: In a case where the rider has manipulated a location on the transparent electrode onto which the video of the switch is projected while the saddle-type vehicle is stopped, the projection apparatus projects video of guidance content corresponding to the switch onto the transparent electrode.

Tenth Feature: In a case where the rider has manipulated a location on the transparent electrode onto which the video of the guidance content is projected or the saddle-type vehicle has started travelling, the projection apparatus stops the projection of the video of the guidance content or projects the video of the switch with a small size in a corner portion of the transparent electrode.

Eleventh Feature: In a case where the saddle-type vehicle or the rider has taken measures corresponding to the guidance content, the projection apparatus stops the projection of the video of the switch.

According to the first feature of the present invention, the transparent electrode is arranged on the transparent member and the video of the switch is projected onto the transparent electrode from the projection apparatus, thereby displaying the virtual switch on the surface of the transparent electrode. In this way, it is possible for the transparent electrode to function as a touch panel. As a result, the rider such as the driver can feel as if they are directly manipulating the switch while viewing the virtual switch projected onto the transparent electrode. Furthermore, it is possible to easily arrange the switch, even on a saddle-type vehicle that has a narrower arrangement space than an automobile.

According to the second feature of the present invention, since the virtual switch is displayed on the surface of the transparent electrode arranged in front of the rider when the rider sits on the seat, it is possible to improve the ability of the rider to manipulate the switch.

According to the third feature of the present invention, the rider sitting on the seat can easily manipulate the switch displayed on the surface of the transparent electrode. Furthermore, it is possible to easily arrange the transparent electrode and the projection apparatus on an existing saddle-type vehicle with a low cost.

According to the fourth feature of the present invention, it is possible to arrange the projection apparatus without obstructing the rider's front view and to project the video of the switch onto the surface of the transparent electrode.

According to the fifth feature of the present invention, the projection apparatus can be arranged without obstructing the rider's view of the display surface of the meter apparatus, and the video of the switch can be projected onto the surface of the transparent electrode.

According to the sixth feature of the present invention, the projection apparatus can be arranged without obstructing the rider's view of the screen of the navigation apparatus, and the video of the switch can be projected onto the surface of the transparent electrode.

According to the seventh feature of the present invention, while the saddle-type vehicle is stopped, the rider can reliably manipulate the switch.

According to the eighth feature of the present invention, it is possible to avoid obstruction of the rider's front view due to the video of the switch while the saddle-type vehicle is travelling. Furthermore, since the video of the switch is projected with a large size while the saddle-type vehicle is stopped, it is possible to prompt the rider to manipulate the switch.

According to the ninth feature of the present invention, the rider can take appropriate measures corresponding to this guidance content by checking the video of the guidance content.

According to the tenth feature of the present invention, In a case where the rider has manipulated the switch, it is assumed that the guidance content has been checked, and the projection of the video of the guidance content is stopped or the video of the switch is displayed with a small size, thereby making it possible to avoid continuation of the display of this guidance content. Furthermore, when the saddle-type vehicle has started travelling, the projection of the video of the guidance content is stopped, thereby making it possible to avoid obstruction of the rider's front view due to the video of the switch or the guidance content. Yet further, when the saddle-type vehicle has started travelling, the video of the switch is projected with a small size, thereby making it possible to draw the attention of the rider to the fact that the guidance content has not been checked.

According to the eleventh feature of the present invention, it possible to avoid continuation of the projection of the same guidance content.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 20 is a perspective view in front of the driver of a motorcycle according to a fifth modification.

FIGS. 21A and 21B are cross-sectional views respectively over the line XXIA-XXIA and XXIB-XXIB of FIG. 20.

FIG. 23 is a perspective view in front of the driver of the motorcycle of FIG. 22.

DESCRIPTION OF THE PREFERRED EMBODIMENTS

A saddle-type vehicle according to the present invention is explained in detail with suitable embodiments and accompanying drawings.

1. Schematic Configuration of the Motorcycle 10

Figure 1:
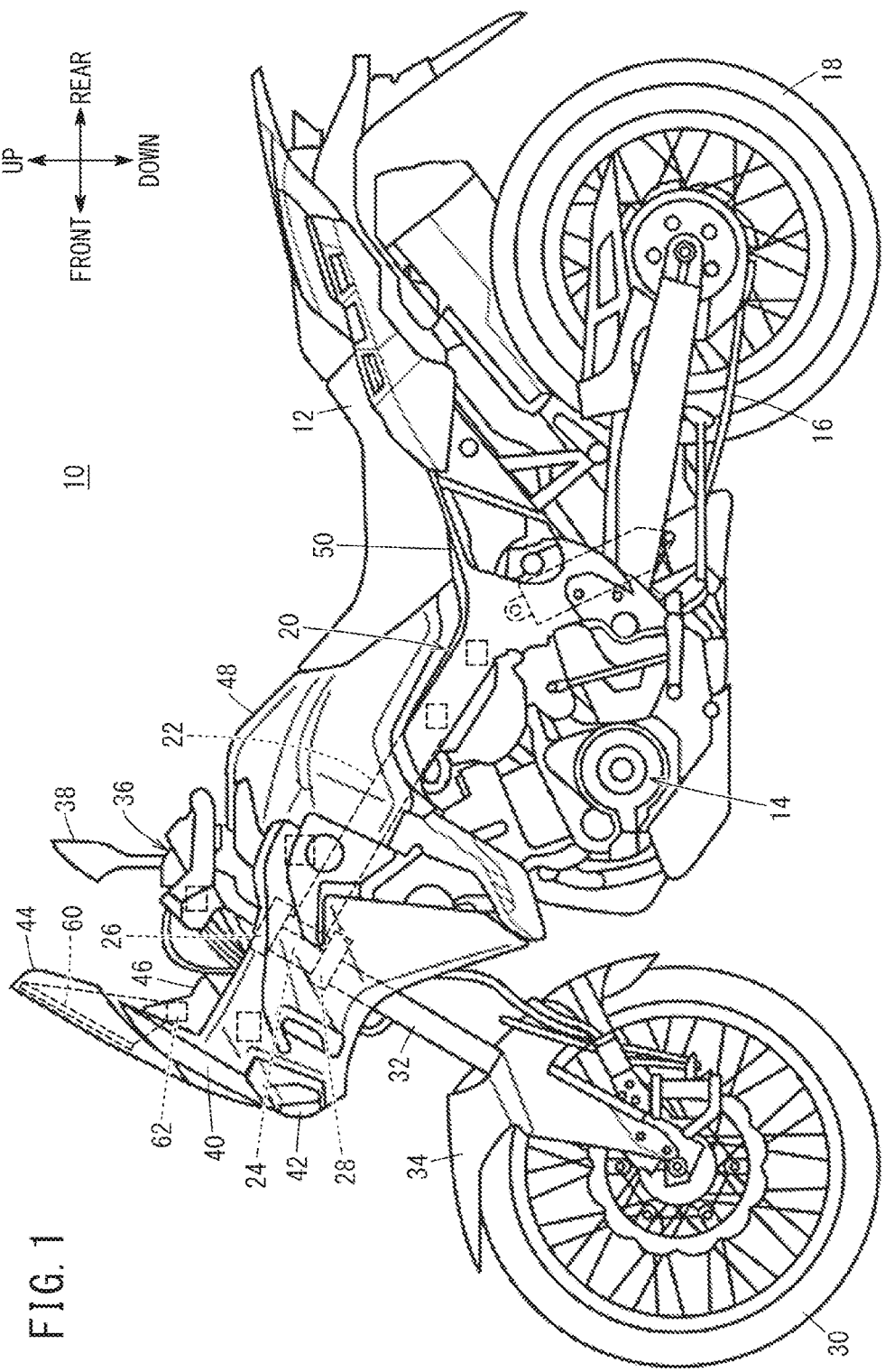
FIG. 1 is a left-side view of a motorcycle according to the present embodiment.

FIG. 1 is a left-side view of a motorcycle 10 serving as the saddle-type vehicle according to the present embodiment. In the following description, the directions of front and back, left and right, and up and down are described as seen by a driver (rider) sitting on a seat 12 of the motorcycle 10.

The motorcycle 10 is a dual-purpose type of saddle-type vehicle that travels by transmitting the drive force of an engine 14 to a rear wheel 18 via a drive chain 16. However, the present embodiment is not limited to the motorcycle 10 shown in FIG. 1, and may be any saddle-type vehicle.

A head pipe 24 that axially supports a bearing shaft (not shown in the drawings) in a pivotable manner is provided on a front end portion of a main frame 22 forming a vehicle frame 20. A top bridge 26 is secured to a top end portion of a steering shaft above the head pipe 24. A bottom bridge 28 is secured to a bottom end portion of the steering shaft below the head pipe 24. The top bridge 26 and the bottom bridge 28 support a left-right pair of front forks 32 that axially support a front wheel 30 of the motorcycle 10 in a rotatable manner. A front fender 34 that covers the front wheel 30 from above is secured to the front fork 32.

A steering handle 36 is secured to the top bridge 26. A left-right pair of back mirrors 38 is attached to the steering handle 36. The front of the steering handle 36 is covered by a front cowl 40. A headlight 42 and a windshield (transparent member) 44 are supported on the front cowl 40. A meter apparatus 46 that displays information, such as a speedometer and a distance meter, is arranged on the rear side of the front cowl 40.

A fuel tank 48 is secured to the main frame 22, to the rear of the steering handle 36. The seat 12 on which the rider such as the driver sits is arranged to the rear of the fuel tank 48 and supported on a seat frame 50 that extends above the rear portion of the vehicle at the rear portion of the main frame 22.

Figure 2:
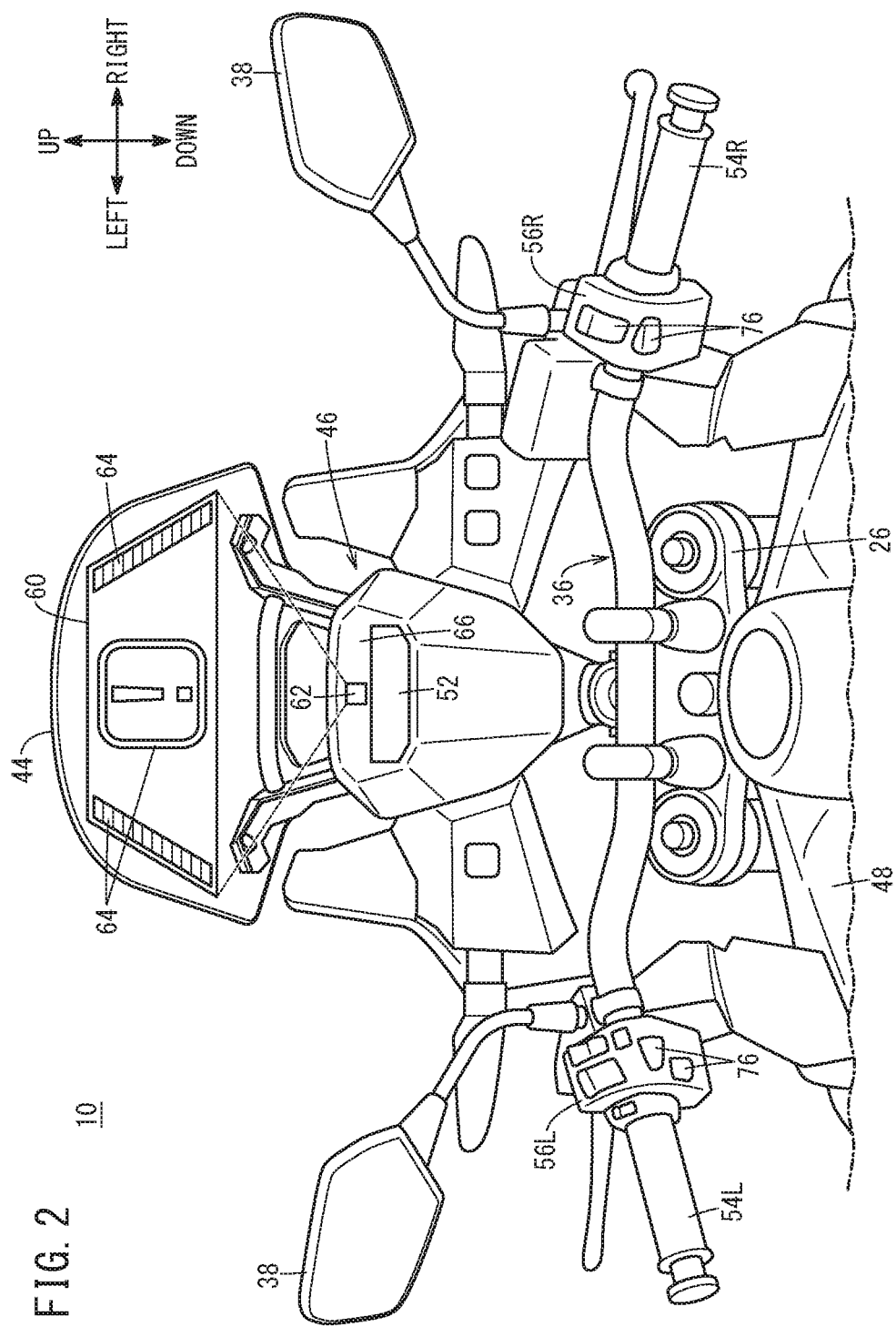
FIG. 2 is a perspective view in front of the driver of the motorcycle of FIG. 1.
Figure 3:
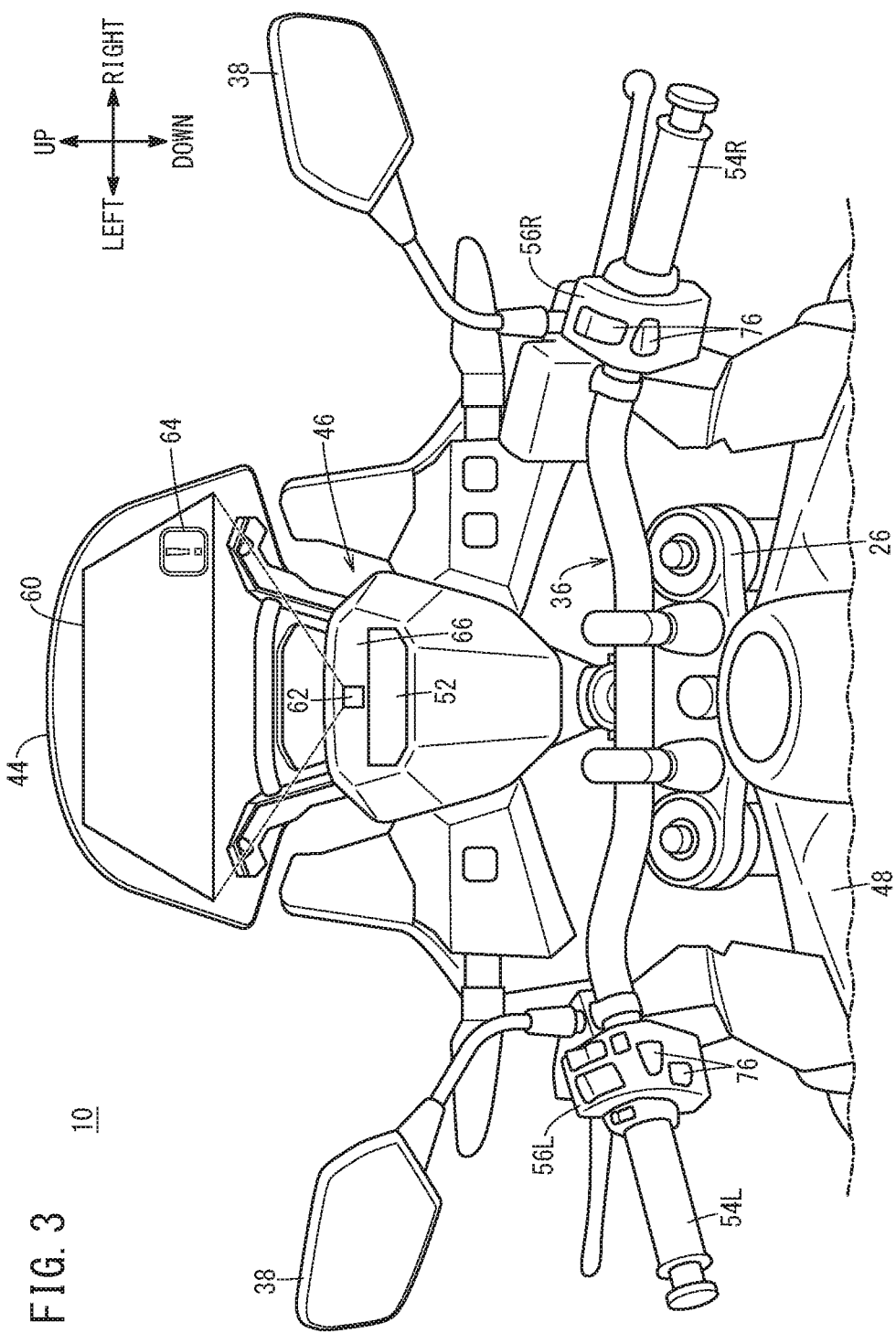
FIG. 3 is a perspective view in front of the driver of the motorcycle of FIG. 1.

FIGS. 2 and 3 are perspective views of the region around the steering handle 36 when the rider is looking forward. The meter apparatus 46 is arranged below the windshield 44, in front of the steering handle 36. The meter apparatus 46 includes a liquid crystal panel 52 that displays information such as vehicle velocity and engine rotational velocity. The meter apparatus 46 is provided with a plurality of manipulation switches, an indicator, and the like.

A right-side handle grip 54R functioning as a pivotable throttle operator and a right-side switch box 56R that includes various switches 76 such as an engine start switch are provided on the right side of the steering handle 36. On the other hand, a left-side handle grip 54L that is gripped by the driver and a left-side switch box 56L including various switches 76 such as a horn switch are provided on the left side of the steering handle 36.

2. Characteristic Configuration of the Motorcycle 10

A characteristic configuration of the motorcycle 10 according to this embodiment is explained with reference to FIGS. 1-3.

The characteristic configuration of the motorcycle 10 is that a transparent electrode 60 is arranged on the transparent member that transparently passes light, such as the windshield 44, and a projection apparatus 62 such as a projector is provided to project video of a switch 64 relating to manipulation of the motorcycle 10 onto the transparent electrode 60.

As described above, in the motorcycle 10, the driver (rider) sits on the seat 12 and drives the motorcycle 10 while looking forward. The transparent electrode 60 and the projection apparatus 62 are arranged in front of the seat 12.

The transparent electrode 60 is formed by applying a conductive coating material of a coating agent or conductive ink, using screen printing or the like, to the surface of a sheet of a polythiophene-based conductive polymer. In a case where the transparent electrode 60 is arranged on the rider-side surface (back surface) of the windshield 44 and the driver presses (manipulates) any location on the surface of the transparent electrode 60 with their finger, when the pressing force exceeds a prescribed threshold value, an electrical signal corresponding to the pressed position is output to the outside. In this way, the transparent electrode 60 functions as a touch panel. The transparent electrode 60 is capable of being arranged on a transparent member such as the windshield 44, and the transparent electrode 60 may be any material and have any shape as long as it transparently passes light and functions as a touch panel.

The projection apparatus 62 is provided on an outer edge portion 66 of the liquid crystal panel 52 of the meter apparatus 46, in a manner not to obstruct the view in front of the rider. In this case, a prescribed region of the transparent electrode 60 is allocated in advance to the switch 64, and video corresponding to the allocated switch 64 is projected onto the surface of the transparent electrode 60 from the projection apparatus 62. In this way, it is possible to virtually display the switch 64 in the region allocated to the switch 64 on the surface of the transparent electrode 60.

FIGS. 2 and 3 show examples of the display content of the transparent electrode 60. FIG. 2 shows a plurality of virtual switches 64 in the center and on the right and left sides of the surface of the transparent electrode 60. FIG. 3 shows a virtual switch 64 displayed to be small in the right corner of the surface of the transparent electrode 60. In this case, when the driver presses (manipulates) the location of a desired switch 64, the transparent electrode 60 can output an electrical signal corresponding to the position of the manipulated switch 64 to the outside.

Figure 4:
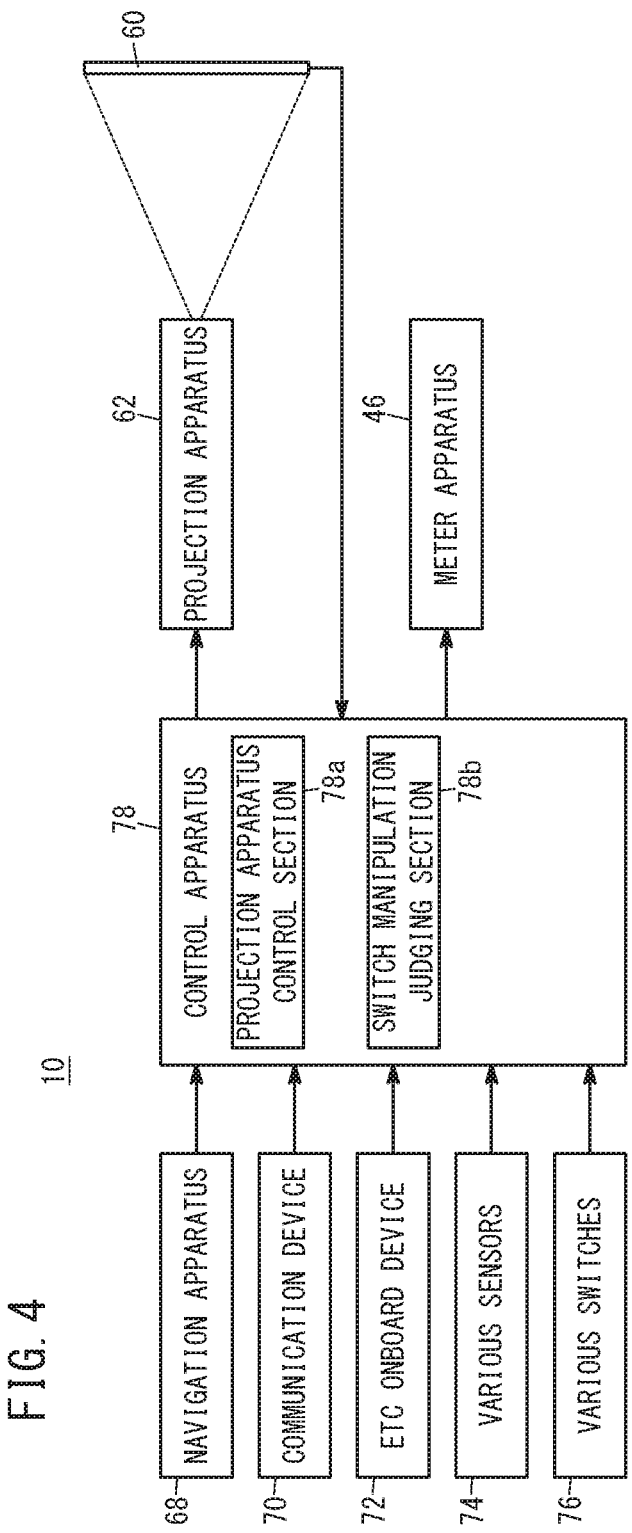
FIG. 4 is a block diagram relating to the projection of video onto the transparent electrode.

FIG. 4 is a block diagram relating to the projection of the video of a switch 64 onto the transparent electrode 60 from the projection apparatus 62.

The motorcycle 10 includes, in addition to the meter apparatus 46, the projection apparatus 62, and the transparent electrode 60 described above, a navigation apparatus 68, a communication device 70, an ETC (electronic toll collection system) onboard device 72, various sensors 74, various switches 76, and a control apparatus 78.

The navigation apparatus 68 performs route guidance and the like for the rider, by communicating with the outside. The communication device 70 is a mobile telephone or smart phone that is possessed by the rider and capable of communicating with the outside. The ETC onboard device 72 is a device for enabling passage through toll locations, by exchanging information about toll fares with toll locations on toll roads when the motorcycle 10 is travelling on a toll road. The navigation apparatus 68, the communication device 70, and the ETC onboard device 72 are not components that are essential to the motorcycle 10, but if these apparatuses and devices are arranged in the motorcycle 10, the information from these apparatuses and devices is input to the control apparatus 78. In FIGS. 1 to 3, the navigation apparatus 68, the communication device 70, and the ETC onboard device 72 are omitted from the drawings.

The various sensors 74 are various sensors relating to the motorcycle 10, including a fuel sensor and a water temperature sensor, for example. The various switches 76 are switches provided to the motorcycle 10, other than the virtual switches 64 displayed in the transparent electrode 60, and are the various switches provided in the right-side switch box 56R and the left-side switch box 56L, for example.

The control apparatus 78 is an ECU (Electronic Control Unit) provided to the motorcycle 10, and realizes the functions of a projection apparatus control section 78a and a switch manipulation judging section 78b by executing a program stored in a memory (not shown in the drawings). The projection apparatus control section 78a causes video of the switch 64 to be projected onto the surface of the transparent electrode 60, by controlling the projection apparatus 62 based on the information input to the control apparatus 78. Accordingly, the projection apparatus control section 78a performs a process to pre-allocate the switches 64 to prescribed regions of the transparent electrode 60. When an electrical signal is input to the control apparatus 78 from the transparent electrode 60, the switch manipulation judging section 78*b* specifies the position on the transparent electrode 60 that output this electrical signal, based on the electrical signal input thereto, and judges whether the driver (rider) has manipulated a virtual switch 64 by checking the specified position against the positions of the switches 64 pre-allocated by the projection apparatus control section 78*a*. Furthermore, the control apparatus 78 outputs prescribed information to the meter apparatus 46, based on the information input thereto, to display this information in the liquid crystal panel 52.

3. Operation of the Present Embodiment

Figure 5:
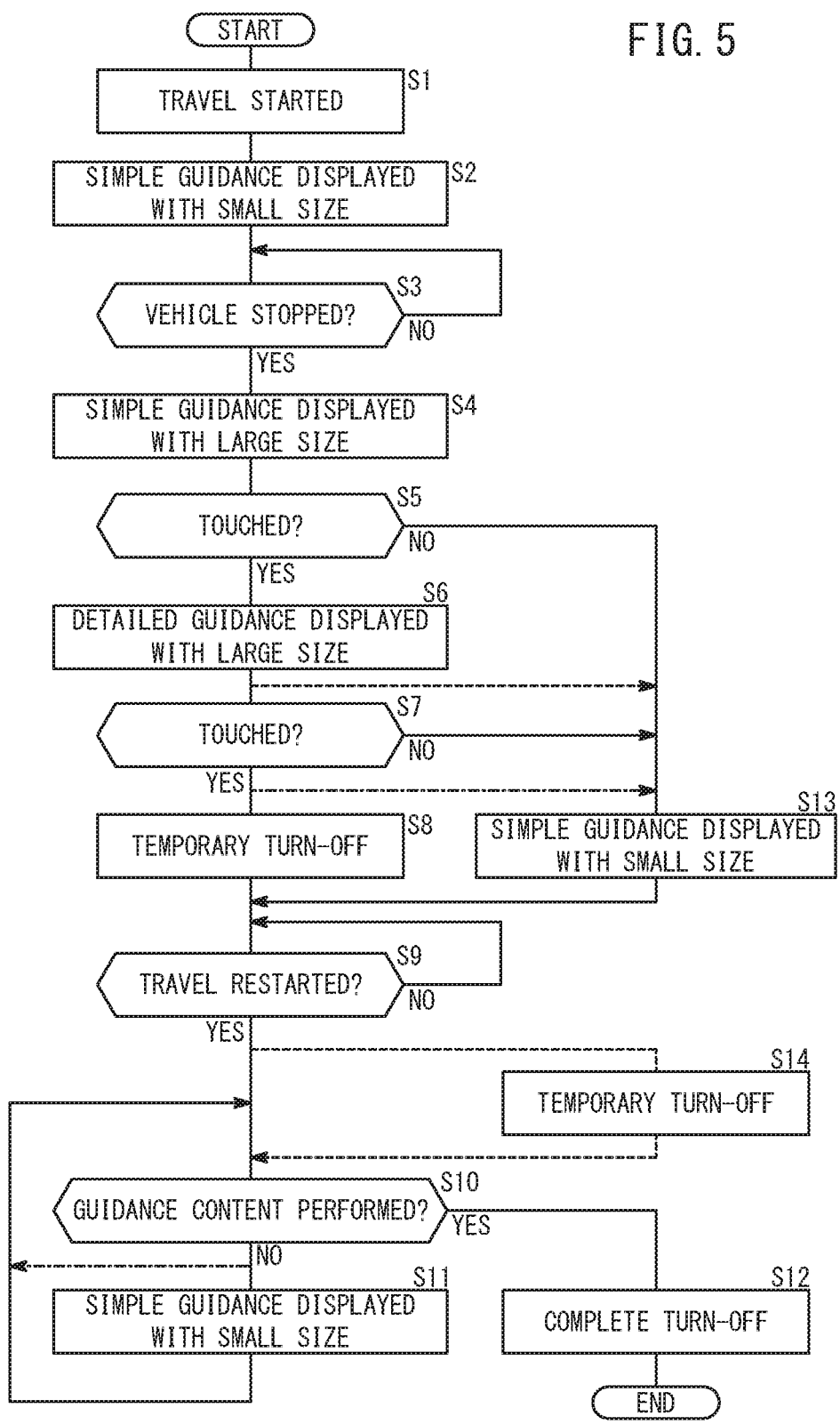
FIG. 5 is a flow chart showing the operation relating to the projection of video onto the transparent electrode of FIG. 1.

The following describes the operation of the motorcycle 10 according to the present embodiment, while referencing the flow chart of FIG. 5 and the perspective views of FIGS. 6 to 13.

Here, the operation relating to the projection of video of the switches 64 from the projection apparatus 62 onto the transparent electrode 60 while the motorcycle 10 is travelling is described using a first display example of FIGS. 6 to 9 and a second display example of FIGS. 10 to 13, while referencing the flow chart of FIG. 5.

3.1. First Display Example

The first display example is a display example on the surface of the transparent electrode 60 for prompting the driver to refuel.

First, at step S1 of FIG. 5, when the motorcycle 10 (see FIG. 1) has started travelling, at step S2, the projection apparatus control section 78*a* (see FIG. 4) of the control apparatus 78 determines a switch 64 to be allocated to a prescribed region of the transparent electrode 60, and outputs a control signal corresponding to the determined content to the projection apparatus 62. The projection apparatus control section 78*a* may judge that the motorcycle 10 is travelling based on the wheel velocity input from a wheel velocity sensor of the front wheel 30 or the rear wheel 18, which is one of the various sensors 74. Due to this, the projection apparatus 62 projects video of the switch 64 onto the surface of the transparent electrode 60, based on the control signal input thereto. In this case, since the motorcycle 10 is travelling, in order not to obstruct the driver's view, the switch 64 displays simple guidance content to the driver (simple guidance) that is small and located in the right corner on the surface of the transparent electrode 60.

Figure 6:
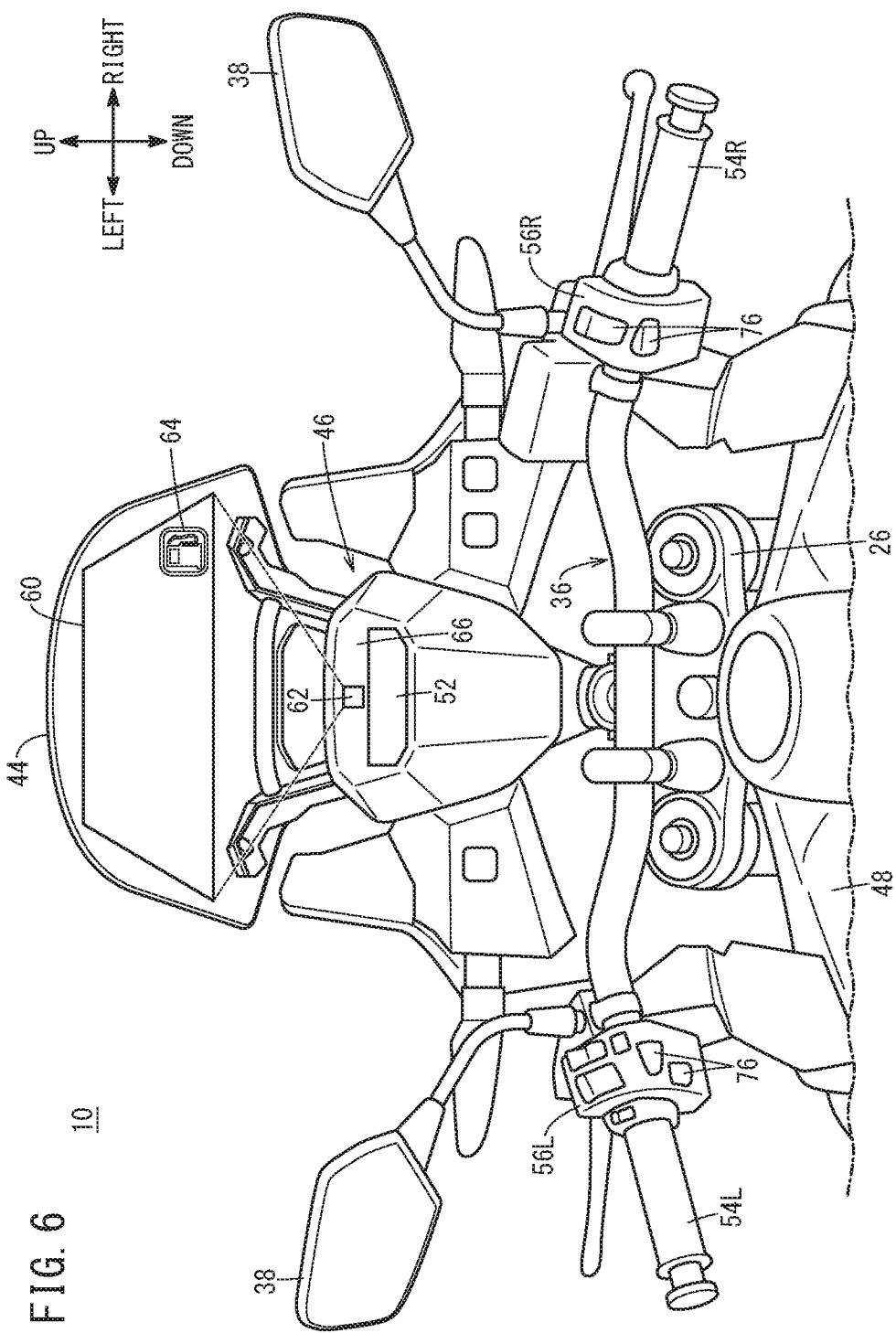
FIG. 6 is a perspective view showing display content of the transparent electrode while travelling, in a first display example.

FIG. 6 shows the display content corresponding to step S2. In FIG. 6, the virtual switch 64 prompting refueling is displayed with a small size in the right corner of the transparent electrode 60, as the simple guidance.

At step S3, the projection apparatus control section 78*a* determines whether the motorcycle 10 has stopped, based on the wheel velocity input to the control apparatus 78. If it is determined that the motorcycle 10 has stopped (step S3: YES), the process proceeds to the following step S4.

At step S4, the projection apparatus control section 78*a* determines that displaying the virtual switch 64 with a large size will not obstruct the driver's view, since the motorcycle 10 is stopped, and makes a determination to display the switch 64 with a large size. Next, the projection apparatus control section 78*a* determines that the switch 64 is to be allocated to a region in the center of the transparent electrode 60, and outputs a control signal corresponding to this determination content to the projection apparatus 62. Due to this, the projection apparatus 62 projects the video of the switch 64 onto the surface of the transparent electrode 60 based on the control signal input thereto, to display the virtual switch 64 with a large size on the surface of the transparent electrode 60. In other words, while the motorcycle 10 is stopped, the display content of the transparent electrode 60 switches from the content shown in FIG. 6 to the content shown in FIG. 7, such that the virtual switch 64 (simple guidance) prompting refueling is displayed with a large size in the center of the surface of the transparent electrode 60.

When the driver who has seen the simple guidance (switch 64) displayed with a large size touches (manipulates) the position of the switch 64 on the transparent electrode 60 with a pressing force greater than or equal to a threshold value, the electrical signal corresponding to the pressed position is output from the transparent electrode 60 to the control apparatus 78.

At step S5, the switch manipulation judging section 78*b* of the control apparatus 78 specifies the position on the transparent electrode 60 that output the electrical signal, based on this electrical signal input thereto, and judges whether the specified position is contained within a region of the switch 64 pre-allocated by the projection apparatus control section 78*a*.

If the specified position is contained in the region of the switch 64, the switch manipulation judging section 78*b* determines that the virtual switch 64 has been manipulated (step S5: YES), and the process proceeds to the following step S6.

At step S6, the projection apparatus control section 78*a* receives the affirmative judgment result of step S5, and makes a determination to display more detailed guidance content (detailed guidance) in the transparent electrode 60 corresponding to the virtual switch 64. Next, the projection apparatus control section 78*a* makes a determination to allocate the switch 64 corresponding to the detailed guidance to the region in the center of the transparent electrode 60, and outputs the control signal corresponding to this determination content to the projection apparatus 62. Due to this, the projection apparatus 62 projects the video of the switch 64 corresponding to the detailed guidance onto the surface of the transparent electrode 60 based on the control signal input thereto, to display the virtual switch 64 with a large size on the surface of the transparent electrode 60.

Figure 7:
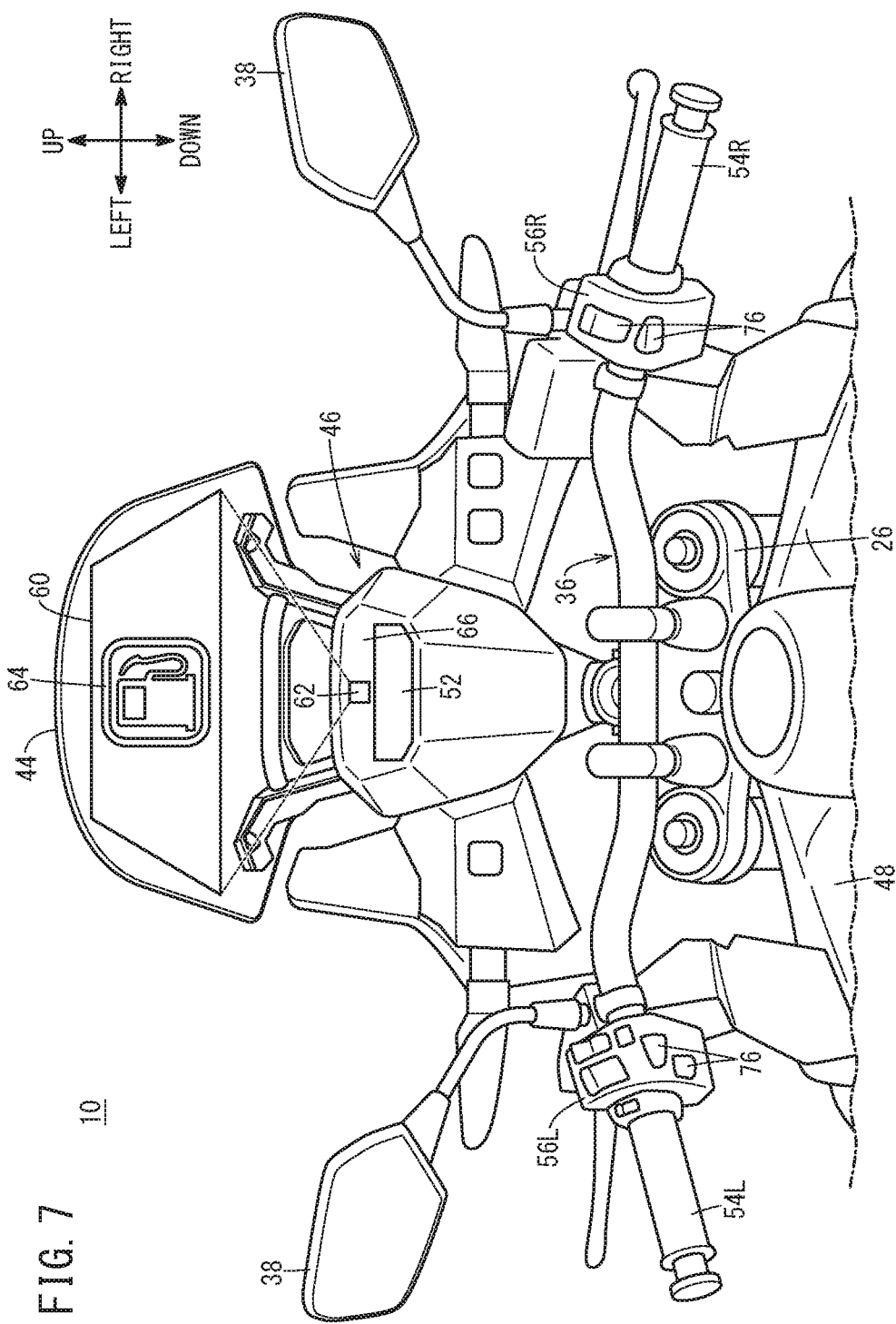
FIG. 7 is a perspective view showing display content of the transparent electrode while stopped, in the first display example.
Figure 8:
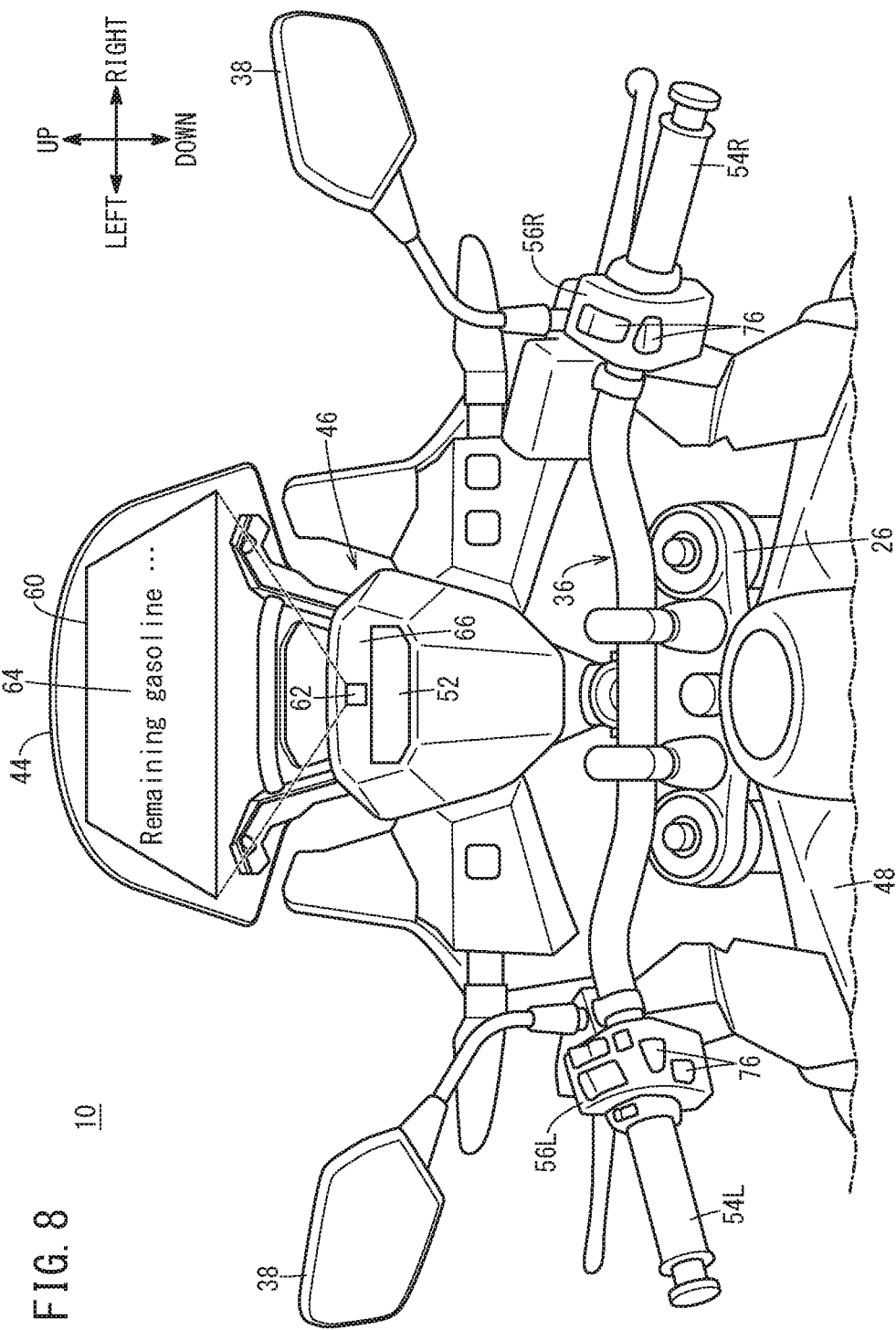
FIG. 8 is a perspective view showing display content of detailed guidance while stopped, in the first display example.
Figure 9:
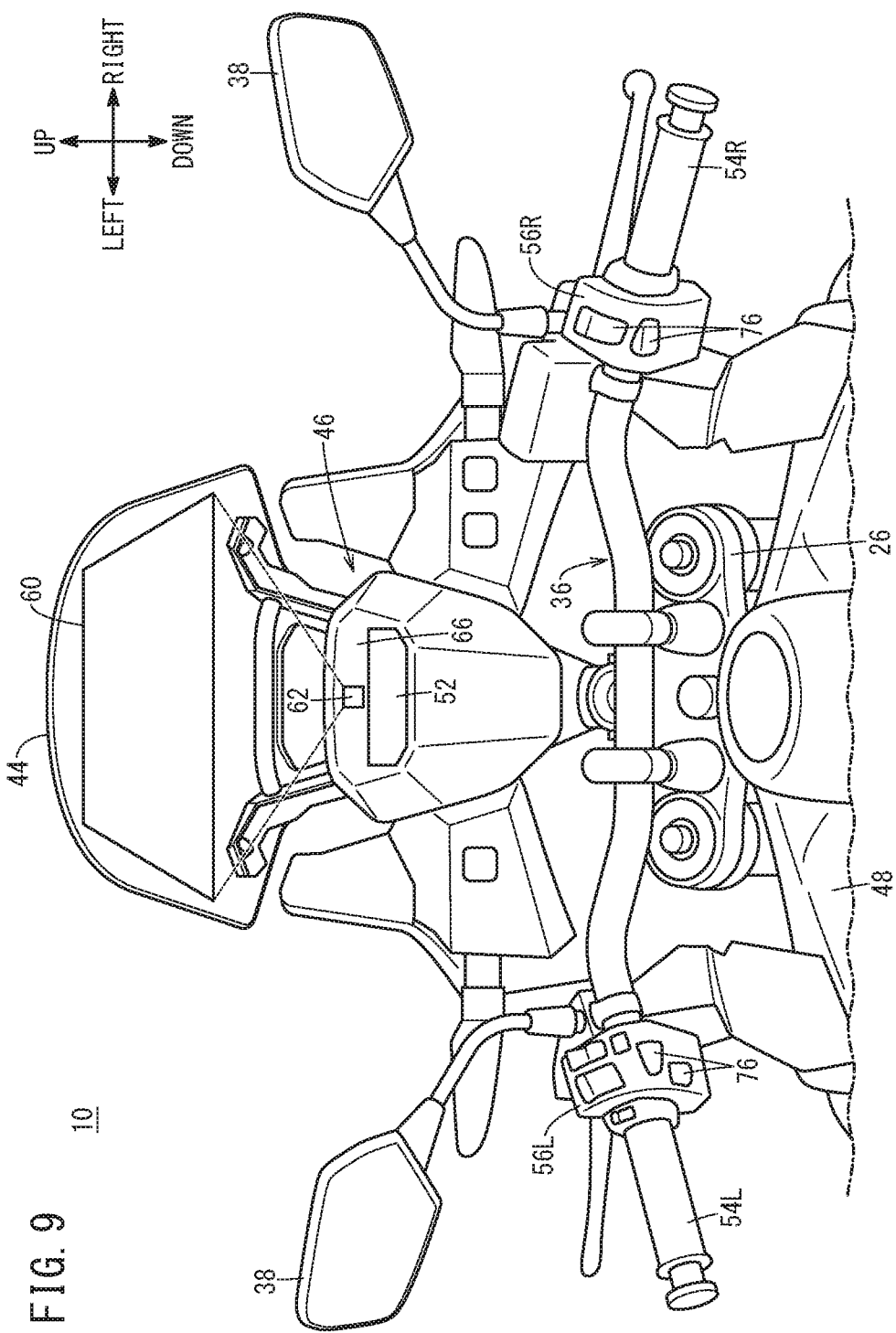
FIG. 9 is a perspective view showing the turned-off state in the first display example.

In other words, the display content of the transparent electrode 60 is switched from the content of FIG. 7 to the content of FIG. 8, such that the virtual switch 64 of the detailed guidance prompting refueling is displayed with a large size in the center of the transparent electrode 60. In FIG. 8, the virtual switch 64 including detailed guidance content of "remaining gasoline low", for example, is displayed with a large size.

When the driver who has seen the detailed content displayed with a large size touches the position of the switch 64 on the transparent electrode 60 with a pressing force greater than or equal to the threshold value, the electrical signal corresponding to the pressed position is output from the transparent electrode 60 to the control apparatus 78.

At step S7, the switch manipulation judging section 78*b* specifies the position on the transparent electrode 60 that output the electrical signal, based on this electrical signal input thereto, and judges whether the specified position is contained in the pre-allocated region of the switch 64, using the same judgment method as in step S5.

If the specified position is contained in the region of the switch 64, the switch manipulation judging section 78*b* determines that the virtual switch 64 has been manipulated (step S7: YES), and the process proceeds to the following step S8.

At step S8, the projection apparatus control section 78a receives the affirmative judgment result of step S7 and, since the driver has checked the detailed guidance and manipulated the switch 64, makes a determination to temporarily stop the display of the virtual switch 64. Next, the projection apparatus control section 78a supplies a control signal instructing the projection apparatus 62 to stop (turn off) the temporary projection. Due to this, the projection apparatus 62, based on the control signal input thereto, temporarily stops and turns off the projection of the video onto the surface of the transparent electrode 60. In this way, the transparent electrode 60 switches from the state of FIG. 8 to the turned-off state of FIG. 9.

At step S9, the projection apparatus control section 78a determines whether the motorcycle 10 has restarted travel, based on the wheel velocity input to the control apparatus 78. If it is determined that the motorcycle 10 has restarted travel (step S9: YES), the process proceeds to step S10.

At step S10, the projection apparatus control section 78a (see FIG. 4) determines whether the content of the simple guidance and the detailed guidance shown on the surface of the transparent electrode 60 has been performed, based on the various pieces of information input to the control apparatus 78.

The first display example is guidance content prompting the driver to refuel, and therefore the projection apparatus control section 78a determines whether the amount of fuel in the fuel tank 48 detected by a fuel sensor, which is one of the various sensors 74, is greater than or equal to a prescribed amount.

If the amount of fuel in the fuel tank 48 has not reached the prescribed amount, the projection apparatus control section 78a determines that the refueling of the fuel tank 48 has not been completed, i.e. the guidance content has not been performed (step S10: NO), and the process proceeds to step S11.

At step S11, since the motorcycle 10 is travelling despite the guidance content not being performed, the projection apparatus control section 78a makes a determination that the simple guidance switch 64 should be displayed with a small size in the prescribed region of the transparent electrode 60, in order to prompt the performance of the guidance content while avoiding obstruction of the outside view of the driver. In this case, in the same manner as in step S2, the projection apparatus control section 78a makes a determination to allocate the switch 64 to the right corner of the surface of the transparent electrode 60 and outputs the control signal corresponding to this determination content to the projection apparatus 62. The projection apparatus 62 projects the video of the switch 64 onto the right corner of the surface of the transparent electrode 60, based on the control signal input thereto. Accordingly, the switch 64 showing the simple guidance is displayed with a small size in the right corner on the surface of the transparent electrode 60 (see FIG. 6).

After this, the process returns to step S10, and the determination process of step S10 is performed again. Accordingly, as long as the guidance content is not performed, the processes of steps S10 and S11 are repeated.

On the other hand, at step S10, if the amount of fuel in the fuel tank 48 is greater than or equal to the prescribed amount, the projection apparatus control section 78a judges that the refueling of the fuel tank 48 has been completed, i.e. that the guidance content has been performed (step S10: YES), and the process proceeds to step S12.

At step S12, the projection apparatus control section 78a judges that display of the virtual switch 64 is no longer necessary because the guidance content has been performed, and makes a determination to stop the projection apparatus 62. Next, in the same manner as in step S8, the projection apparatus control section 78a supplies the control signal instructing the projection apparatus 62 to stop projecting (complete turn-off). In this way, the projection apparatus 62 stops and turns off the projection of the video onto the surface of the transparent electrode 60, based on the control signal input thereto. In this way, the display content of the transparent electrode 60 is switched from the state shown in FIG. 6 to the turned-off state shown in FIG. 9.

If the switch manipulation judging section 78b judges at step S5 that the virtual switch 64 has not been manipulated (step S5: NO), the process proceeds to step S13. At step S13, the projection apparatus control section 78a displays the switch 64 of the simple guidance in the right corner on the surface of the transparent electrode 60, in the same manner as in step S2. After this, the process proceeds to step S9.

3.2. Second Display Example

The second example in FIGS. 10 to 13 is an example where the guidance content (e.g. route guidance) is shown on the surface of the transparent electrode 60 in coordination with the navigation apparatus 68. Here, a display example is described in which a left turn at a prescribed guidance location in the progression direction of the motorcycle 10 is displayed on the surface of the transparent electrode 60 to guide the driver. In the second display example, the same explanations as in the first display example are omitted.

In the second display example, when the motorcycle 10 starts travelling (step S1 of FIG. 5), the projection apparatus control section 78a (see FIG. 4) in step S2 makes a determination to allocate the switch 64 to the right corner on the surface of the transparent electrode 60, based on the information of the route content input from the navigation apparatus 68, and outputs the control signal corresponding to the determination content to the projection apparatus 62. The projection apparatus 62 projects, based on the control signal input thereto, the video of the switch 64 with a small size in the right corner on the surface of the transparent electrode 60.

Figure 10:
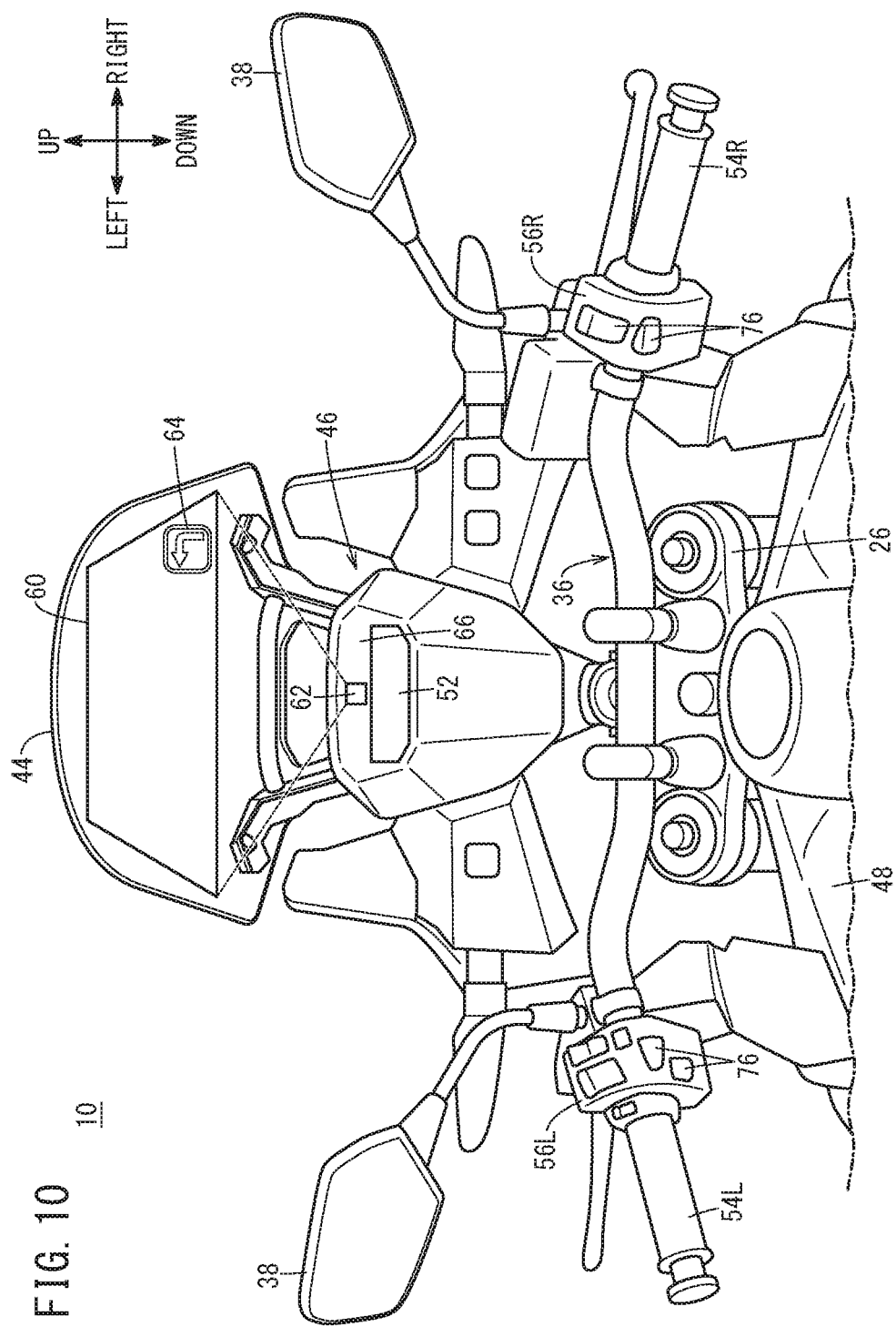
FIG. 10 is a perspective view showing display content of the transparent electrode while travelling, in a second display example.
Figure 11:
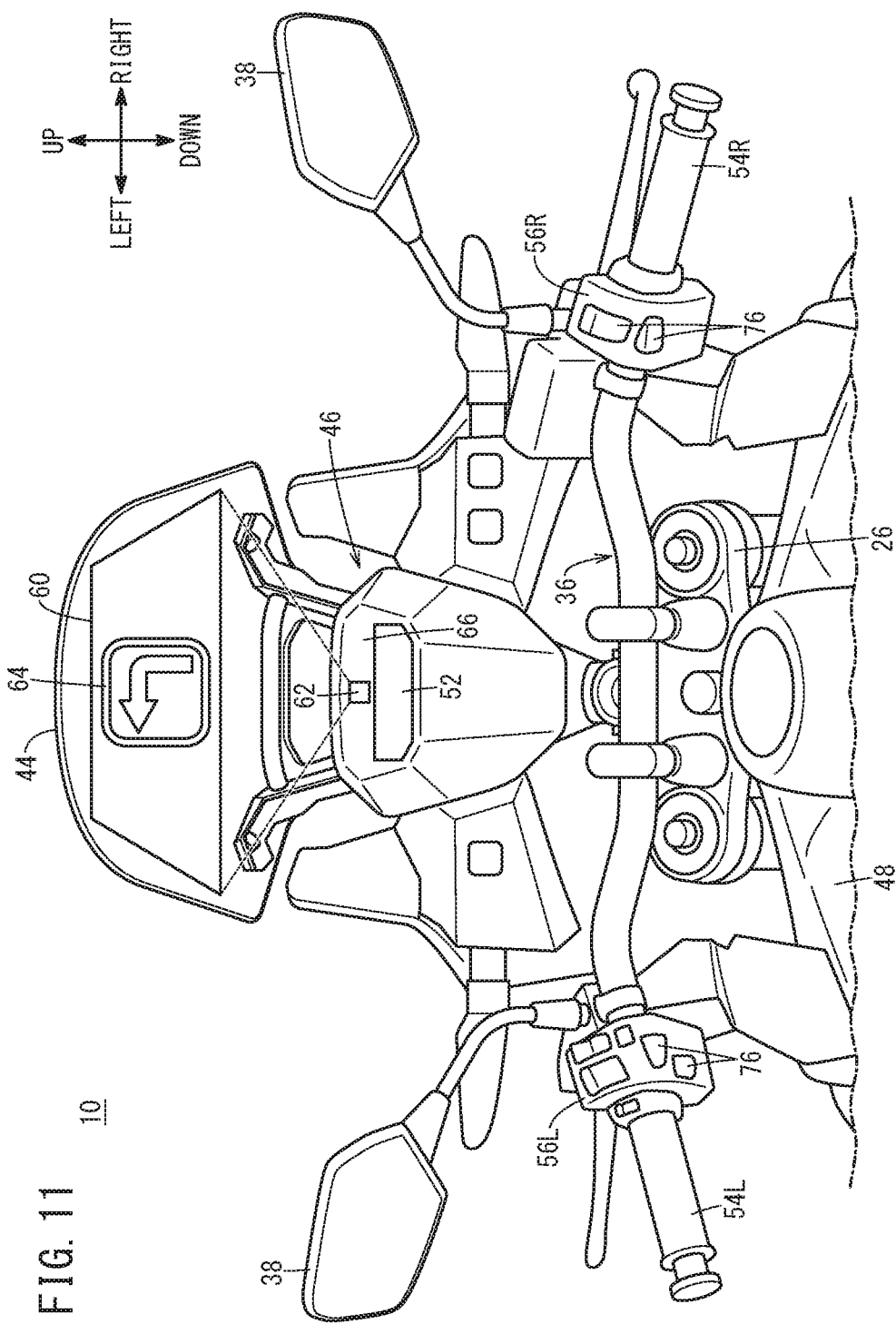
FIG. 11 is a perspective view showing display content of the transparent electrode while stopped, in the second display example.

FIG. 10 shows display content corresponding to step S2, for the second display example. In FIG. 10, a virtual switch 64 prompting a left turn is displayed with a small size in the right corner of the transparent electrode 60 as the simple guidance.

After this, when the motorcycle 10 stops (step S3: YES), at step S4, the projection apparatus control section 78a allocates the switch 64 to the region in the center of the transparent electrode 60 and outputs the control signal corresponding to this determination content to the projection apparatus 62, in order to display the virtual switch 64 with a large size. The projection apparatus 62 projects and displays the video of the virtual switch 64 with a large size in the center of the surface of the transparent electrode 60, based on the control signal input thereto. In other words, the display content of the transparent electrode 60 switches from the content of FIG. 10 to the content of FIG. 11, such that the virtual switch 64 prompting a left turn is displayed with a large size in the center of the transparent electrode 60.

Figure 12:
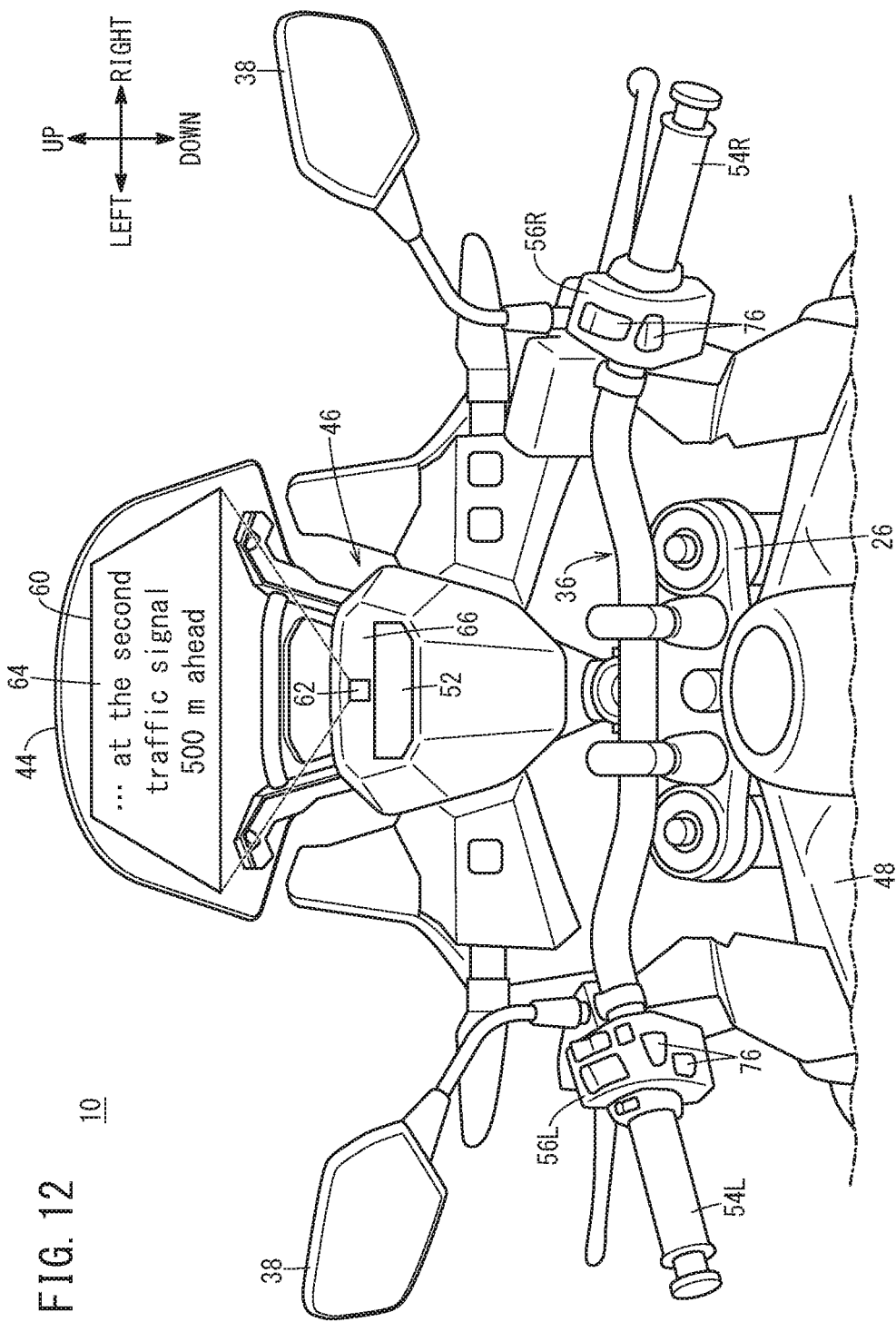
FIG. 12 is a perspective view showing display content of detailed guidance while stopped, in the second display example.

After this, if the switch manipulation judging section 78b has judged that the virtual switch 64 has been manipulated by the driver (step S5: YES), at step S6, the projection apparatus control section 78a allocates the switch 64 corresponding to the detailed guidance to the region in the center of the transparent electrode 60 and outputs the control signal corresponding to this determination content to the projection apparatus 62. The projection apparatus 62 projects and displays the video of the switch 64 of the detailed guidance with a large size on the surface of the transparent electrode 60, based on the control signal input thereto (see FIG. 12). In FIG. 12, the virtual switch 64 including detailed guidance content of "turn right at the second traffic signal 500 m ahead", for example, is displayed with a large size.

If the switch manipulation judging section 78b has judged that the driver has manipulated the virtual switch 64 (step S7: YES), at step S8, the projection apparatus control section 78a temporarily stops (turns off) the display of the transparent electrode 60. Accordingly, the transparent electrode 60 switches to the turned-off state of FIG. 9.

Figure 13:
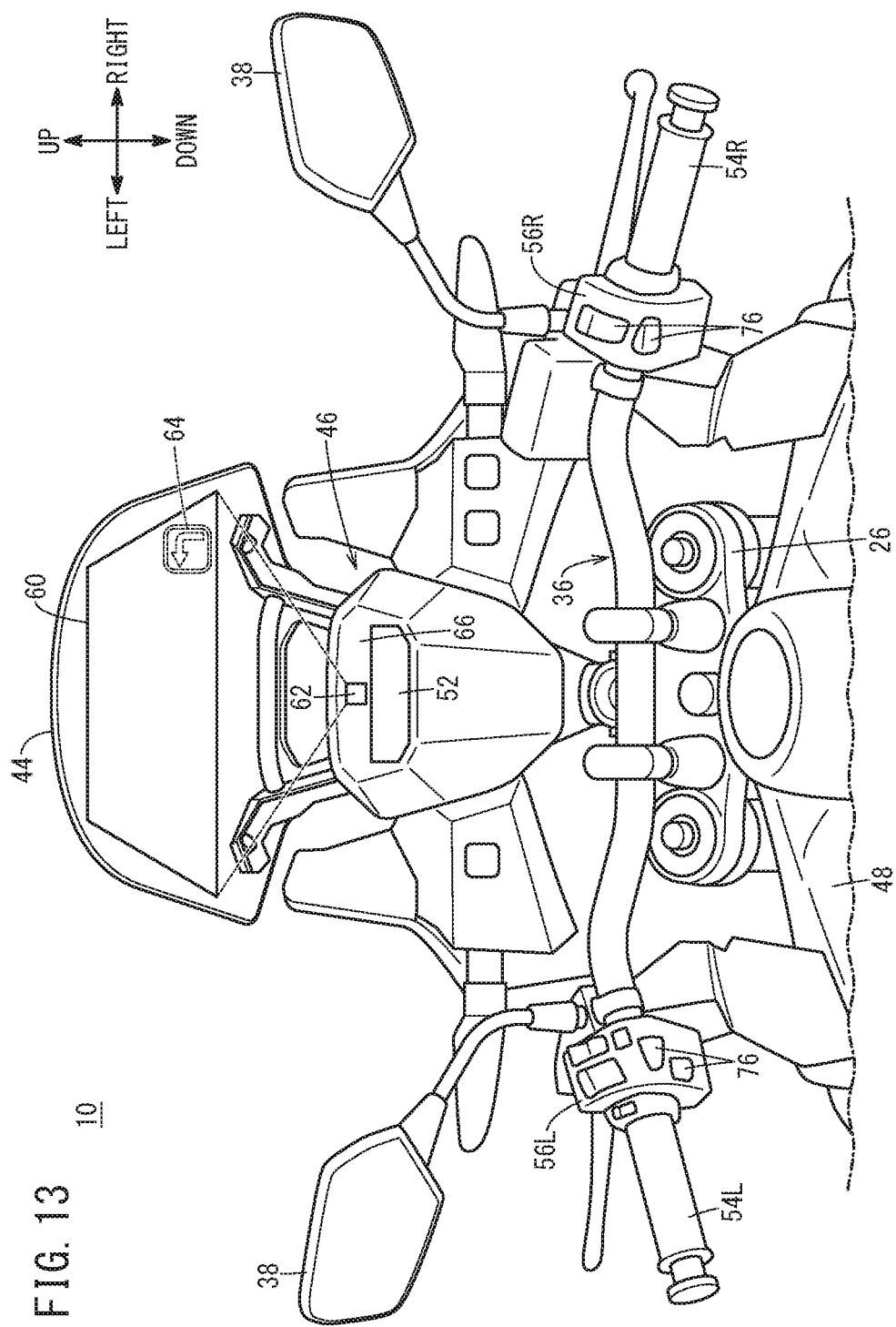
FIG. 13 is a perspective view showing display content of the transparent electrode while travelling, in the second display example.

After this, the motorcycle 10 restarts travelling (step S9: YES), and if the guidance content has not been performed, i.e. if the motorcycle 10 has not turned left (step S10: NO), at step S11, the projection apparatus control section 78a displays the switch 64 of the simple guidance in the right corner on the surface of the transparent electrode 60, in the same manner as in step S2. In this case, if the motorcycle 10 is near the guidance location for the left turn, the switch 64 of the simple guidance may be displayed flashing in the right corner on the surface of the transparent electrode 60 to draw the driver's attention to the fact that the guidance location is approaching, as shown in FIG. 13.

Then, when the motorcycle 10 has turned left, i.e. when the guidance content has been performed (step S10: YES), at step S12, the projection apparatus control section 78a stops (completely turns off) the display of the transparent electrode 60. Accordingly, the surface of the transparent electrode 60 switches to the turned-off state shown in FIG. 9.

In the second display example as well, if the virtual switch 64 was not manipulated at step S5 (step S5: NO), at step S13, the switch 64 of simple guidance is displayed with a small size in the right corner on the surface of the transparent electrode 60 (see FIG. 10).

3.3. Other Process of FIG. 5

Operations illustrated in FIG. 5 can be modified as below.

As shown by the dashed line in FIG. 5, after a certain time has passed from when the switch 64 of the detailed guidance is displayed with a large size in step S6, the process may move to step S13 to display the simple guidance with a small size. In this case, after the motorcycle 10 has restarted travelling (step S9: YES), the process may move to step S14 and, in the same manner as in step S8, the projection onto the surface of the transparent electrode 60 may be temporarily stopped (turned off) and then the determination process of step S10 may be performed.

Furthermore, as shown by the single-dashed line in FIG. 5, after an affirmative determination result is obtained at step S7 (step S7: YES), the process may move to step S13 and the guidance content may be displayed with a small size. In this case, the guidance content is displayed with a small size even after the motorcycle 10 has restarted travelling (step S9: YES), and therefore if a negative determination result is obtained at step S10 (step S10: NO), step S11 may be skipped and the determination process of step S10 may be repeated.

Yet further, the operations of FIG. 5 are not limited to the first display example and the second display example, and can be applied to the display of switches such as described below. (1) Display of a switch relating to travel of the motorcycle 10 (e.g. display of a switch relating to information or warnings about oil amount or water temperature). (2) Display of a switch relating to audio (display of a switch to adjust volume, select a song, or turn the power ON/OFF). (3) Display of a switch for mail reception guidance or incoming call guidance of a smart phone or mobile telephone serving as the communication device 70. (4) Display of a switch relating to the ETC onboard device 72 (display of a switch for presence or absence of the ETC card, or payment guidance). (5) Display of a switch relating to a grip heater or trip meter. (6) Display of a switch for various types of guidance (left turn, right turn, or route guidance) related to the navigation apparatus 68.

4. Modifications of the Present Embodiment

The following describes modifications (first to sixth modifications) of the motorcycle 10 according to the present embodiment, while referencing FIGS. 14 to 23. In the first to sixth modifications, components that are the same as in FIGS. 1 to 13 are given the same reference numerals, and detailed descriptions thereof are omitted.

4.1. First Modification

Figure 14:
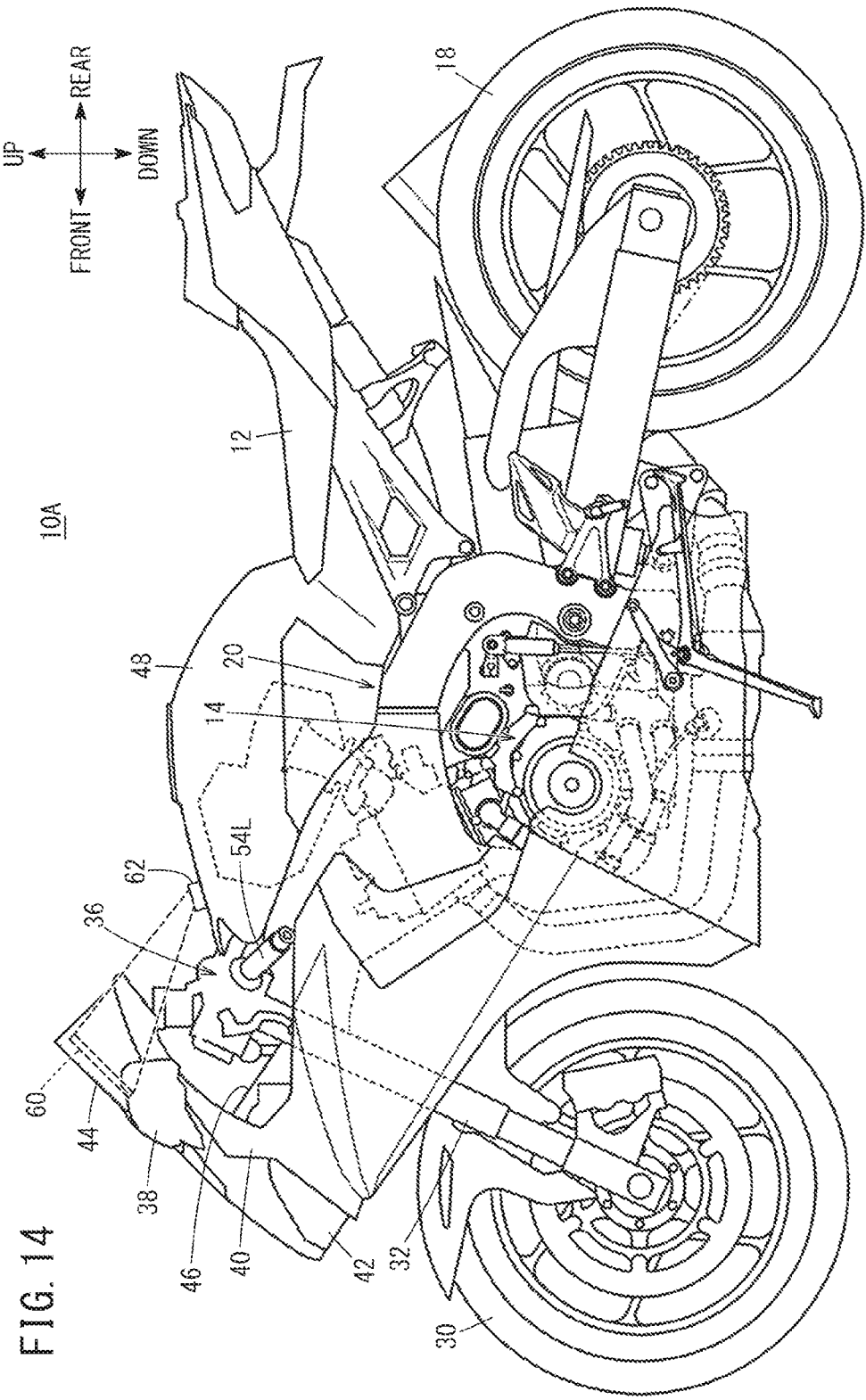
FIG. 14 is a left-side view of a motorcycle according to a first modification.
Figure 15:
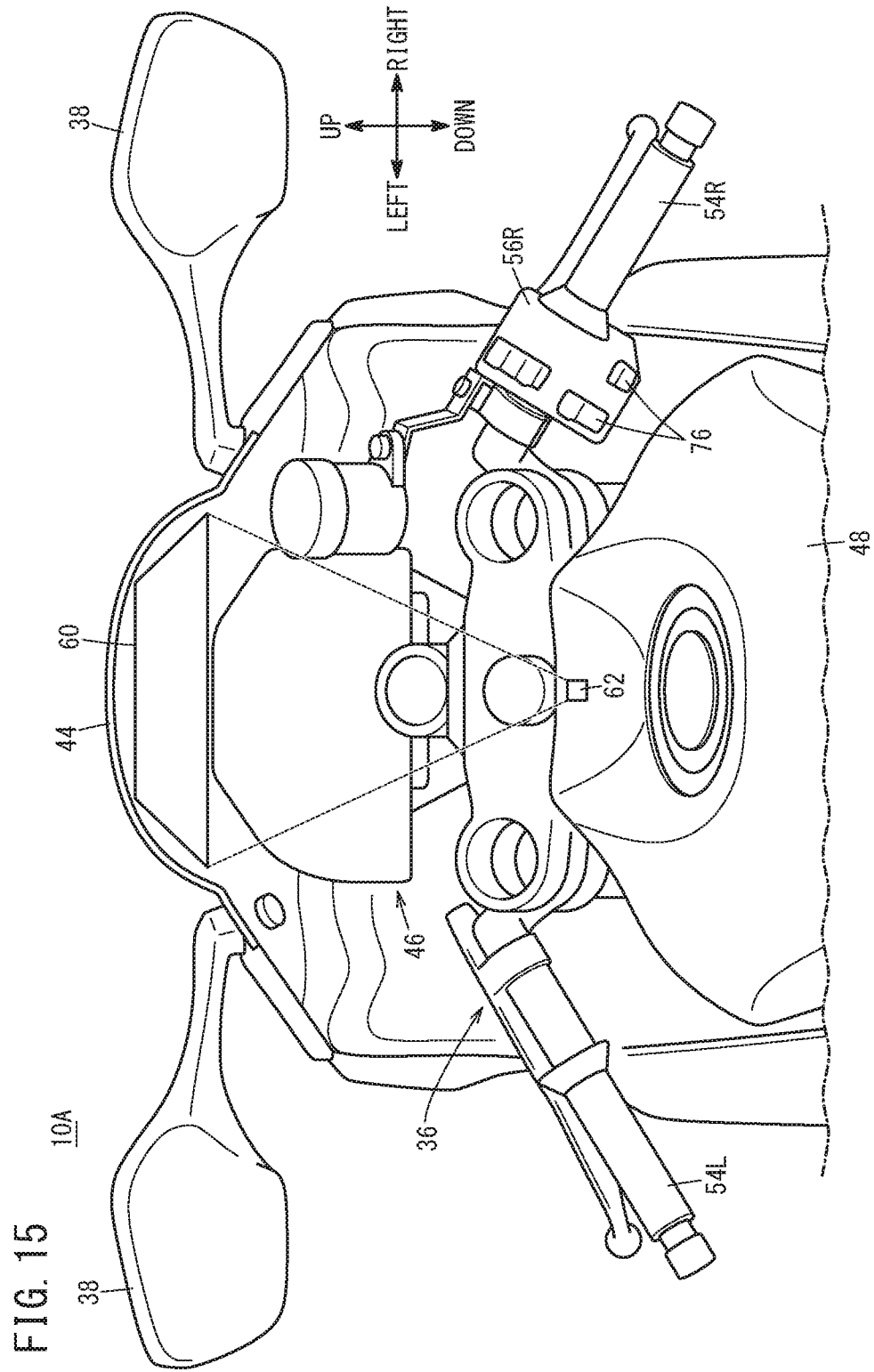
FIG. 15 is a perspective view in front of the driver of the motorcycle of FIG. 14.

As shown in FIGS. 14 and 15, the first modification has the transparent electrode 60 arranged on the back surface of the windshield 44 of a motorcycle 10A that is a different type than the motorcycle 10 shown in FIG. 1, and also has the projection apparatus 62 arranged on the top surface of the fuel tank 48. In the first modification as well, the transparent electrode 60 and the projection apparatus 62 are arranged in front of the seat 12, and therefore it is possible to project the video of the switch 64 onto the surface of the transparent electrode 60 from the projection apparatus 62, while avoiding obstruction of the rider's view.

4.2. Second Modification

Figure 16:
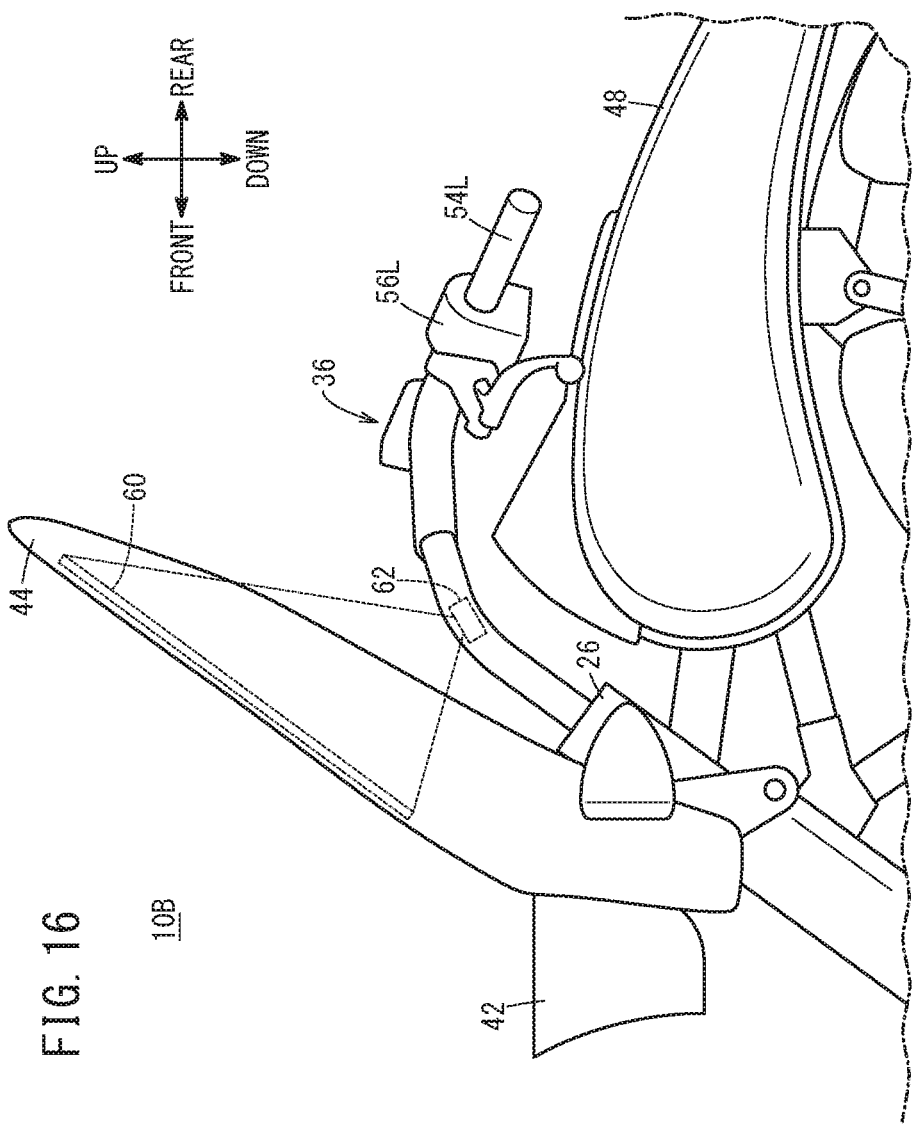
FIG. 16 is a left-side view of the front portion of a motorcycle according to a second modification.

As shown in FIG. 16, the second modification has the transparent electrode 60 arranged on the back surface of the windshield 44 in a motorcycle 10B that is a different type than the motorcycles 10 and 10A shown in FIGS. 1 and 14, and also has the projection apparatus 62 arranged on the steering handle 36. In the second modification as well, the transparent electrode 60 and the projection apparatus 62 are arranged in front of the seat 12, and therefore it is possible to achieve the same effect as the above embodiment and the first modification.

4.3. Third Modification

Figure 17:
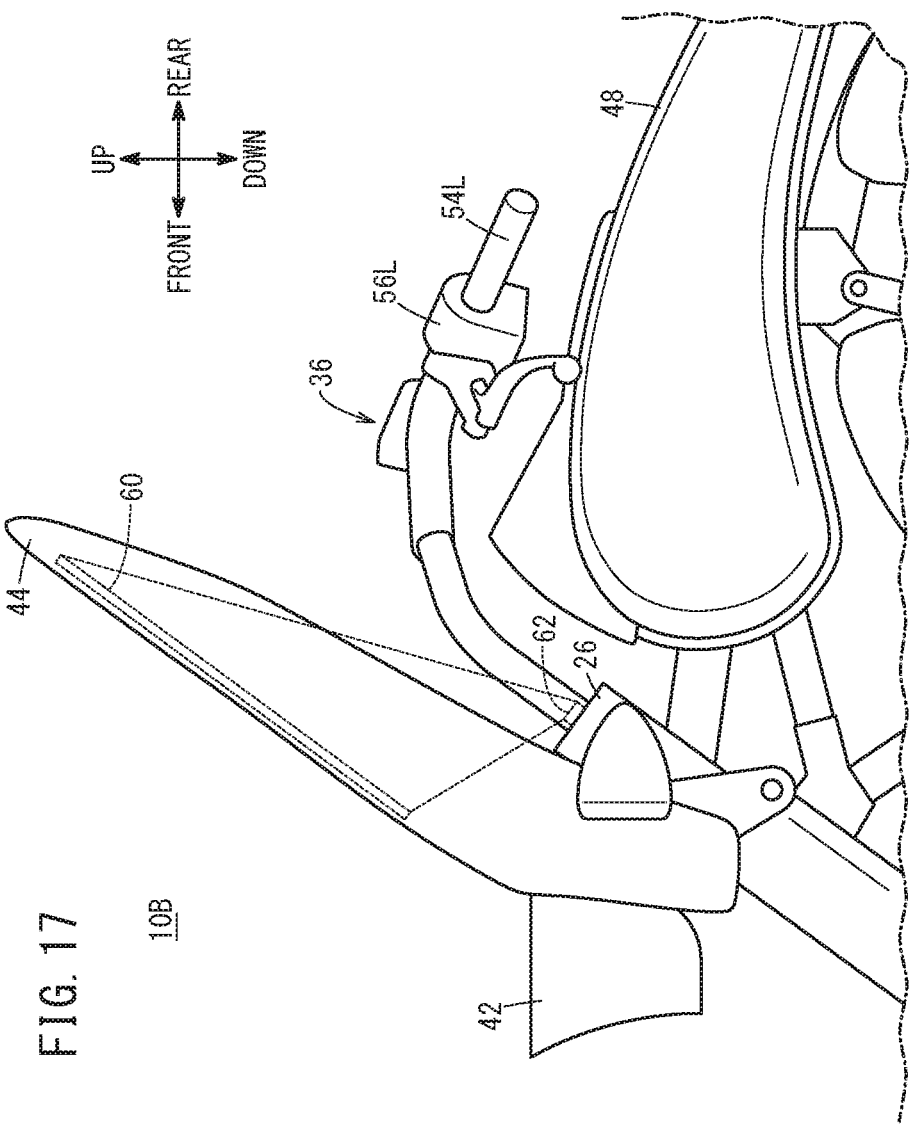
FIG. 17 is a left-side view of the front portion of a motorcycle according to a third modification.

As shown in FIG. 17, the third modification has the transparent electrode 60 arranged on the back surface of the windshield 44 in the motorcycle 10B (see FIG. 16) of the second modification, and also has the projection apparatus 62 arranged on the top bridge 26. In the third modification as well, the transparent electrode 60 and the projection apparatus 62 are arranged in front of the seat 12, and therefore it is possible to achieve the same effect as the above embodiment, the first modification, and the second modification.

4.4. Fourth Modification

Figure 18:
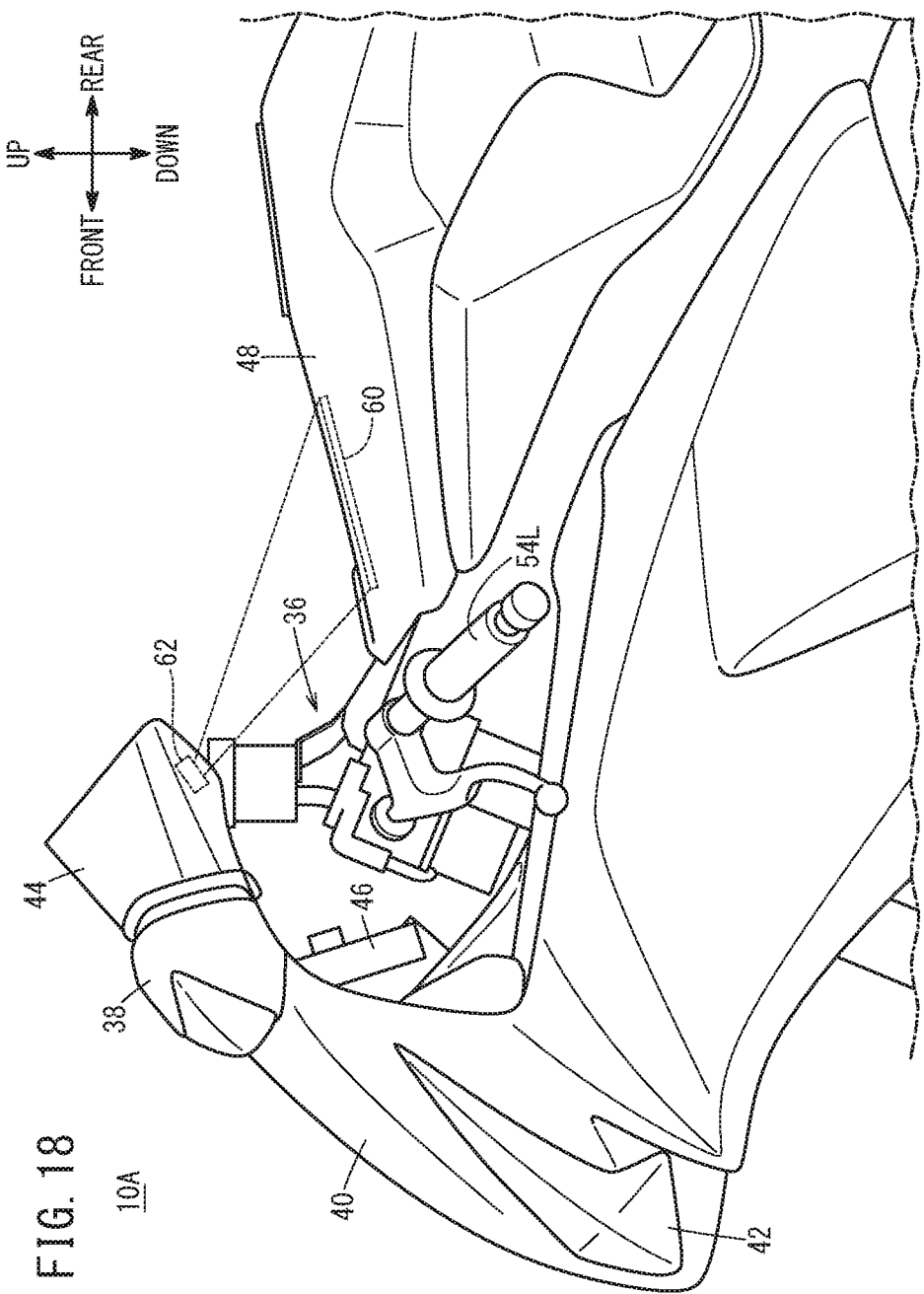
FIG. 18 is a left-side view of the front portion of a motorcycle according to a fourth modification.
Figure 19:
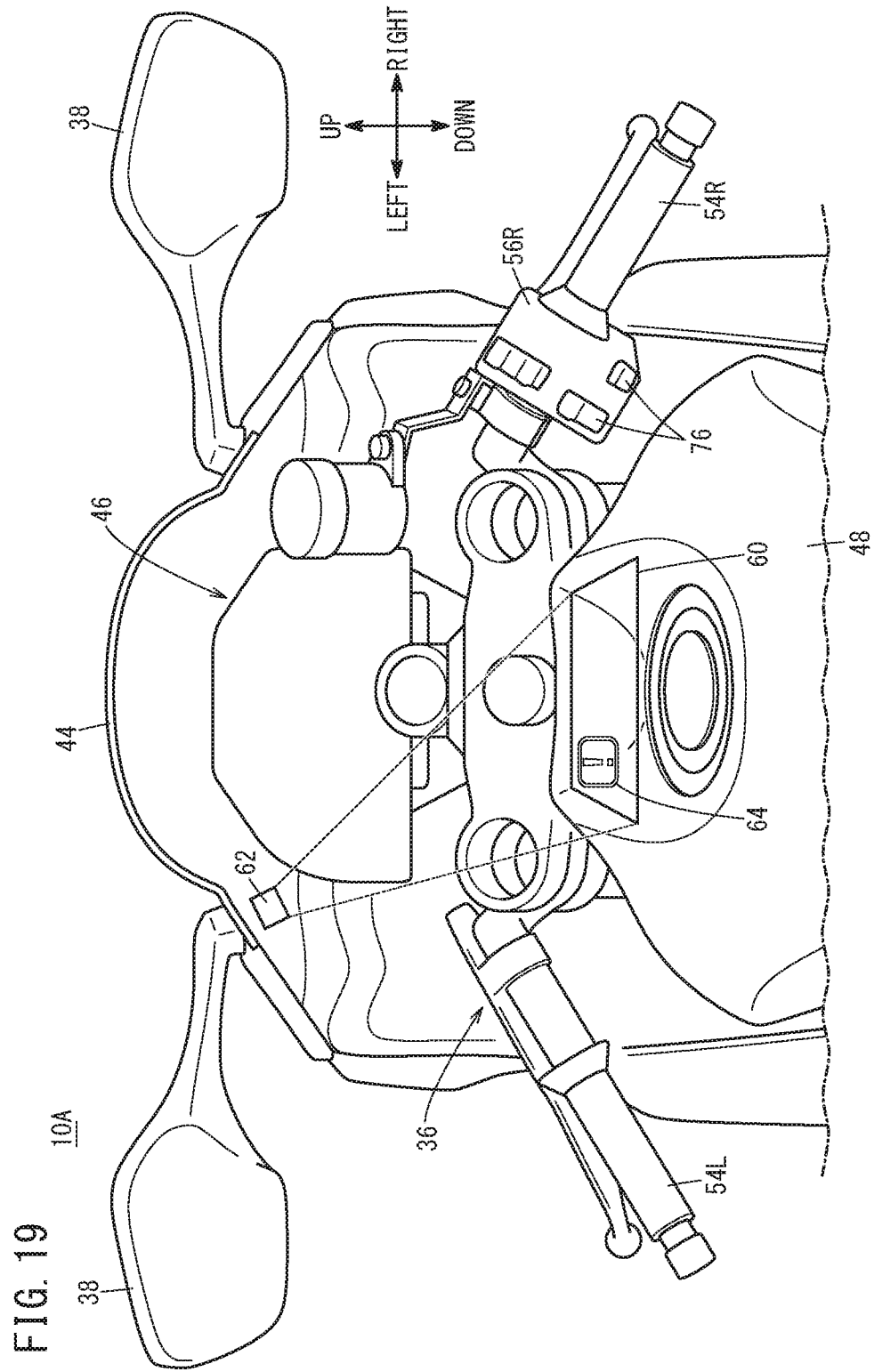
FIG. 19 is a perspective view in front of the driver of the motorcycle of FIG. 18.

As shown in FIGS. 18 and 19, the fourth modification has the transparent electrode 60 arranged on the top surface of the fuel tank 48 in the motorcycle 10A (see FIGS. 14 and 15) of the first modification, and also has the projection apparatus 62 arranged on the front cowl 40. In the fourth modification as well, the transparent electrode 60 and the projection apparatus 62 are arranged in front of the seat 12, and therefore it is possible to achieve the same effect as the above embodiment and the first to third modifications.

4.5. Fifth Modification

As shown in FIGS. 20 to 21B, the fifth modification has the transparent electrode 60 arranged on a lens (transparent lens) 80 of the meter apparatus 46 in a motorcycle 10C, and also has the projection apparatus 62 arranged in the meter apparatus 46.

In this case, in the example shown in FIG. 21A, the projection apparatus 62 is attached to a dial plate 86 in a manner to avoid a needle 84, inside the meter apparatus 46 (inward from the housing 82 and the lens 80). Accordingly, the projection apparatus 62 projects the video of the switch 64 onto the transparent electrode 60 from the inside of the meter apparatus 46, via the lens 80 that is a transparent member.

Furthermore, in the example shown in FIG. 21B, the projection apparatus 62 is arranged inside the meter apparatus 46 in a manner to be embedded in a housing 82. In this case as well, the projection apparatus 62 can project the video of the switch 64 onto the transparent electrode 60 from inside the meter apparatus 46, via the lens 80.

In the fifth modification as well, the transparent electrode 60 and the projection apparatus 62 are arranged in front of the seat 12, and therefore it is possible to achieve the same effect as in the above embodiment and the first to fourth modifications. Furthermore, since the projection apparatus 62 is provided inside the meter apparatus 46, the presence of the projection apparatus 62 does not obstruct the view of the driver toward the meter apparatus 46 when the driver looks at the meter apparatus 46.

4.6. Sixth Modification

Figure 22:
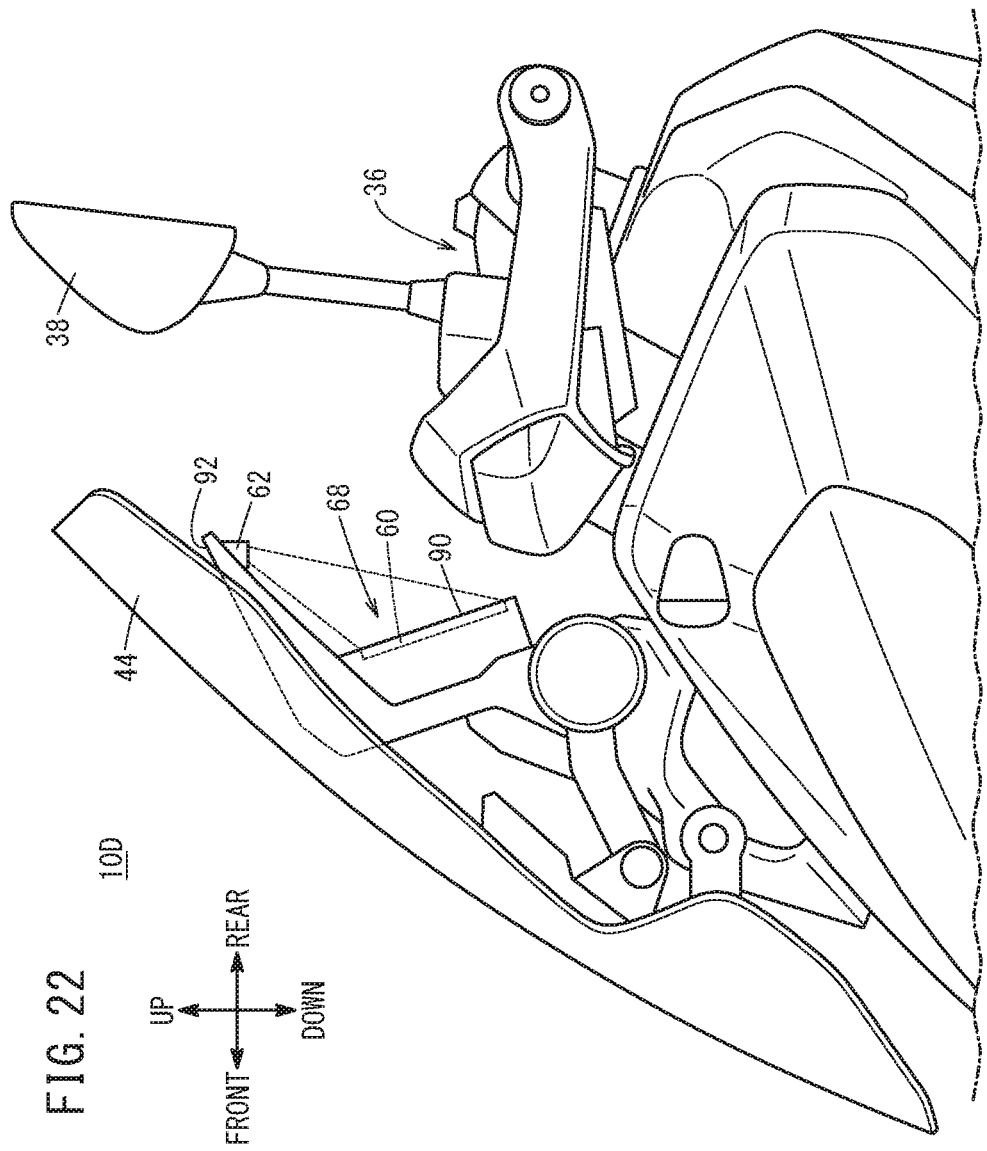
FIG. 22 is a left-side view of the front portion of a motorcycle according to a sixth embodiment.

As shown in FIGS. 22 and 23, the sixth modification has the transparent electrode 60 arranged on a liquid crystal panel 90 of the navigation apparatus 68 in a motorcycle 10D that is a different type than the motorcycle 10 shown in FIG. 1, and also has the projection apparatus 62 arranged on an outer edge portion 92 surrounding the liquid crystal panel 90 on the navigation apparatus 68. In the sixth modification as well, the transparent electrode 60 and the projection apparatus 62 are arranged in front of the seat 12, and therefore it is possible to achieve the same effect as the above embodiment and the first to fifth modifications.

5. Effect of the Present Embodiment

As described above, according to the motorcycle 10 of the present embodiment, the transparent electrode 60 is arranged on the transparent member (windshield 44, lens 80 of the meter apparatus 46, or liquid crystal panel 90 of the navigation apparatus 68) and the video of the switch 64 is projected onto the transparent electrode 60 from the projection apparatus 62, thereby displaying the virtual switch 64 on the surface of the transparent electrode 60. In this way, it is possible for the transparent electrode 60 to function as a touch panel. As a result, the rider such as the driver can feel as if the rider is directly manipulating the switch 64 while viewing the virtual switch 64 projected onto the transparent electrode 60. Furthermore, it is possible to easily arrange the switch 64, even on the motorcycle 10 that has a narrower arrangement space than an automobile.

Since the virtual switch 64 is displayed on the surface of the transparent electrode 60 arranged in front of the rider when the rider sits on the seat 12, it is possible to improve the ability of the rider to manipulate the switch 64.

The rider sitting on the seat 12 can easily manipulate the switch 64 displayed on the surface of the transparent electrode 60. Furthermore, it is possible to easily arrange the transparent electrode 60 and the projection apparatus 62 on an existing motorcycle 10 with a low cost.

In a case where the transparent electrode 60 is arranged on the back surface of the windshield 44, the projection apparatus 62 is arranged on the outer edge portion 66 of the meter apparatus 46, the steering handle 36, the top bridge 26, or the fuel tank 48, and therefore it is possible to arrange the projection apparatus 62 without obstructing the rider's front view and to project the video of the switch 64 onto the surface of the transparent electrode 60.

In a case where the transparent electrode 60 is arranged on the surface of the lens 80 of the meter apparatus 46, the projection apparatus 62 can be arranged inside the meter apparatus 46 without obstructing the rider's view of the display surface (dial plate 86 or lens 80) of the meter apparatus 46, and the video of the switch 64 can be projected onto the surface of the transparent electrode 60.

In a case where the transparent electrode 60 is arranged on the surface of the liquid crystal panel 90 of the navigation apparatus 68, the projection apparatus 62 is arranged on the outer edge portion 92 of the navigation apparatus 68, and therefore the projection apparatus 62 can be arranged without obstructing the rider's view of the screen (liquid crystal panel 90) of the navigation apparatus 68, and the video of the switch 64 can be projected onto the surface of the transparent electrode 60.

The projection apparatus 62 can at least project the video of the switch 64 onto the transparent electrode 60 while the motorcycle 10 is stopped, and therefore the rider can reliably manipulate the switch 64.

The projection apparatus 62 projects the video of the switch 64 with a small size in the right corner of the transparent electrode 60 while the motorcycle 10 is travelling, and projects the video of the switch 64 with a large size in the center of the transparent electrode 60 when the motorcycle 10 is stopped. In this way, it is possible to avoid obstruction of the rider's front view due to the video of the switch 64 while the motorcycle 10 is travelling. Furthermore, since the video of the switch 64 is projected with a large size while the motorcycle 10 is stopped, it is possible to prompt the rider to manipulate the switch 64.

In a case where the rider has manipulated a location on the transparent electrode 60 where the video of the switch 64 is projected while the motorcycle 10 is stopped, the projection apparatus 62 projects video of the guidance content corresponding to this switch 64 onto the transparent electrode 60, and therefore the rider can take appropriate measures corresponding to this guidance content by checking the video of the guidance content.

In a case where the rider has manipulated the switch 64, it is assumed that the guidance content has been checked, and the projection of the video of the guidance content is stopped or the video of the switch 64 is displayed with a small size, thereby making it possible to avoid continuation of the display of this guidance content. Furthermore, when the motorcycle 10 has started travelling, the projection of the video of the guidance content is stopped, thereby making it possible to avoid obstruction of the rider's front view by the video of the switch 64 or the guidance content. Yet further, when the motorcycle 10 has started travelling, the video of the switch 64 is projected with a small size, thereby making it possible to draw the attention of the rider to the fact that the guidance content has not been checked.

When the motorcycle 10 or the rider has taken measures corresponding to the guidance content, the projection apparatus 62 stops the projection of the video of the switch 64, thereby making it possible to avoid continuation of the projection of the same guidance content.

While the preferred embodiments of the present invention have been described above, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A saddle-type vehicle that is straddled by a rider of the vehicle, comprising a transparent member that transparently passes light, further comprising:
   a transparent electrode that is arranged on the transparent member and can be manipulated by the rider; and
   a projection apparatus that projects video of a switch relating to manipulation of the saddle-type vehicle onto the transparent electrode,
   wherein the projection apparatus projects video of a switch onto the transparent electrode, while the saddle-type vehicle is travelling and the saddle-type vehicle is stopped,
   displays of the video of the switch projected are different depending on whether the video is projected while the saddle-type vehicle is travelling or the video is projected while the saddle-type vehicle is stopped, and
   the video of the switch is projected small on the transparent electrode while the saddle-type vehicle is travelling and the video of the switch is projected large on the transparent electrode while the saddle-type vehicle is stopped, the switch projected large being a same shape as the switch projected small.

2. The saddle-type vehicle according to claim 1, wherein the transparent member, the transparent electrode, and the projection apparatus are provided to the saddle-type vehicle and arranged in front of a seat on which the rider sits.

3. The saddle-type vehicle according to claim 2, wherein the transparent member is a windshield, a transparent lens of a meter apparatus, or a panel of a navigation apparatus, and the transparent electrode is arranged on a rider-side surface of the windshield, the transparent lens, or the panel.

4. The saddle-type vehicle according to claim 3, wherein in a case where the transparent electrode is arranged on the rider-side surface of the windshield, the projection apparatus is provided to an outer edge portion of the meter apparatus or the saddle-type vehicle, and is arranged on a steering handle, a top bridge, or a fuel tank arranged in front of the seat.

5. The saddle-type vehicle according to claim 3, wherein in a case where the transparent electrode is arranged on the rider-side surface of the transparent lens, the projection apparatus is provided inside the meter apparatus and projects the video of the switch onto the transparent electrode via the transparent lens.

6. The saddle-type vehicle according to claim 3, wherein in a case where the transparent electrode is arranged on the rider-side surface of the panel, the projection apparatus is provided on an outer edge portion of the navigation apparatus.

7. The saddle-type vehicle according to claim 1, wherein the projection apparatus projects the video of the switch with a small size onto a corner portion of the transparent electrode while the saddle-type vehicle is travelling, and projects the video of the switch with a large size onto a center portion of the transparent electrode while the saddle-type vehicle is stopped.

8. The saddle-type vehicle according to claim 7, wherein in a case where the rider has manipulated a location on the transparent electrode onto which the video of the switch is projected while the saddle-type vehicle is stopped, the projection apparatus projects video of guidance content corresponding to the switch onto the transparent electrode.

9. The saddle-type vehicle according to claim 8, wherein in a case where the rider has manipulated a location on the transparent electrode onto which the video of the guidance content is projected or the saddle-type vehicle has started travelling, the projection apparatus stops the projection of the video of the guidance content or projects the video of the switch with a small size in a corner portion of the transparent electrode.

10. The saddle-type vehicle according to claim 9, wherein in a case where the saddle-type vehicle or the rider has taken measures corresponding to the guidance content, the projection apparatus stops the projection of the video of the switch.

* * * * *